United States Patent
Lee et al.

(10) Patent No.: US 10,816,982 B2
(45) Date of Patent: Oct. 27, 2020

(54) VEHICLE CONTROL DEVICE MOUNTED ON VEHICLE AND METHOD FOR CONTROLLING THE VEHICLE

(71) Applicant: LG Electronics Inc., Seoul (KR)

(72) Inventors: Hansung Lee, Seoul (KR); Jaesaek Oh, Seoul (KR); Junyoung Yu, Seoul (KR)

(73) Assignee: LG Electronics Inc., Seoul (KR)

( * ) Notice: Subject to any disclaimer, the term of this patent is extended or adjusted under 35 U.S.C. 154(b) by 285 days.

(21) Appl. No.: 15/866,013

(22) Filed: Jan. 9, 2018

(65) Prior Publication Data

US 2019/0018419 A1    Jan. 17, 2019

(30) Foreign Application Priority Data

Jul. 11, 2017    (KR) ........................ 10-2017-0088021

(51) Int. Cl.
*G05D 1/02* (2020.01)
*G08G 1/0967* (2006.01)
(Continued)

(52) U.S. Cl.
CPC ......... *G05D 1/0214* (2013.01); *B60W 30/181* (2013.01); *B60W 30/18154* (2013.01); (Continued)

(58) Field of Classification Search
CPC .. G05D 1/0214; G05D 1/0246; G05D 1/0219; G05D 1/0088; G05D 2201/0213; (Continued)

(56) References Cited

U.S. PATENT DOCUMENTS

| 9,672,734 | B1 | 6/2017 | Ratnasingam |
| 9,740,945 | B2 * | 8/2017 | Divekar ................... B60T 7/18 |

(Continued)

FOREIGN PATENT DOCUMENTS

| DE | 102008061303 | 6/2009 |
| DE | 102015214689 | 2/2016 |

(Continued)

OTHER PUBLICATIONS

European Search Report in European Application No. 18158277.6, dated Oct. 24, 2018, 10 pages.

(Continued)

*Primary Examiner* — Hunter B Lonsberry
*Assistant Examiner* — Luis A Martinez Borrero
(74) *Attorney, Agent, or Firm* — Fish & Richardson P.C.

(57) ABSTRACT

A vehicle control device for a vehicle includes: a communication unit configured to receive vehicle-to-everything (V2X) information, the V2X information including position data; and a control unit configured to generate a control signal associated with driving of the vehicle based on the V2X information. The control unit generates the control signal associated with driving of the vehicle by: determining an expected driving route of the vehicle; based on the determination of the expected driving route of the vehicle, determining a region of interest; and based on the determination of the region of interest, selectively receiving first V2X information associated with the region of interest by: transmitting, through the communication unit, a request for transmission of the first V2X information associated with the region of interest to communication-enabled devices; and receiving, through the communication unit, the first V2X information transmitted by the communication-enabled devices.

21 Claims, 14 Drawing Sheets

(51) Int. Cl.
*B60W 30/18* (2012.01)
*G08G 1/16* (2006.01)
*G08G 1/09* (2006.01)
*G01S 13/931* (2020.01)

(52) U.S. Cl.
CPC ..... *B60W 30/18163* (2013.01); *G05D 1/0289* (2013.01); *G08G 1/09* (2013.01); *G08G 1/09675* (2013.01); *G08G 1/096708* (2013.01); *G08G 1/096725* (2013.01); *G08G 1/096783* (2013.01); *G08G 1/096791* (2013.01); *G08G 1/163* (2013.01); *G08G 1/165* (2013.01); *G08G 1/166* (2013.01); *G08G 1/167* (2013.01); *B60W 2556/45* (2020.02); *B60W 2556/50* (2020.02); *B60W 2556/55* (2020.02); *B60W 2556/60* (2020.02); *B60W 2556/65* (2020.02); *G01S 2013/9316* (2020.01)

(58) Field of Classification Search
CPC . G05D 1/0274; G05D 1/0291; B60W 30/181; B60W 30/18154; B60W 30/18163; G08G 1/166; G08G 1/163
See application file for complete search history.

(56) References Cited

U.S. PATENT DOCUMENTS

| | | | | |
|---|---|---|---|---|
| 9,751,506 | B2* | 9/2017 | Mudalige | G08G 1/166 |
| 9,805,601 | B1* | 10/2017 | Fields | G08G 1/096791 |
| 9,983,591 | B2* | 5/2018 | Micks | G06K 9/00228 |
| 9,990,548 | B2* | 6/2018 | Wellington | G05D 1/0088 |
| 10,126,136 | B2* | 11/2018 | Iagnemma | G05D 1/0088 |
| 10,215,583 | B2* | 2/2019 | Ng-Thow-Hing | H04N 7/188 |
| 10,222,229 | B1* | 3/2019 | Shum | G01C 21/3697 |
| 10,338,591 | B2* | 7/2019 | Baalke | B60W 30/0956 |
| 10,373,504 | B2* | 8/2019 | Ahn | G01C 21/3697 |
| 10,378,919 | B2* | 8/2019 | DeCia | G01C 21/3667 |
| 10,496,097 | B2* | 12/2019 | Jang | G05D 1/0088 |
| 10,585,435 | B2* | 3/2020 | Fujita | G05D 1/0088 |
| 2014/0278052 | A1 | 9/2014 | Slavin et al. | |
| 2016/0003636 | A1* | 1/2016 | Ng-Thow-Hing | G01C 21/3658 701/26 |
| 2016/0203719 | A1* | 7/2016 | Divekar | B60R 1/00 701/70 |
| 2016/0285935 | A1* | 9/2016 | Wu | G08G 1/161 |
| 2017/0113665 | A1* | 4/2017 | Mudalige | G08G 1/166 |
| 2017/0131719 | A1* | 5/2017 | Micks | G06K 9/3233 |
| 2017/0174261 | A1* | 6/2017 | Micks | B60W 30/00 |
| 2017/0262709 | A1* | 9/2017 | Wellington | G06K 9/00818 |
| 2017/0369055 | A1* | 12/2017 | Saigusa | G08G 1/0116 |
| 2018/0004211 | A1* | 1/2018 | Grimm | G05D 1/0214 |
| 2018/0045832 | A1* | 2/2018 | Ibrahim | G08G 1/167 |
| 2018/0095457 | A1* | 4/2018 | Lee | G08G 1/096775 |
| 2018/0147988 | A1* | 5/2018 | Lee | G08G 1/0133 |
| 2018/0150086 | A1* | 5/2018 | Nobukawa | G01C 21/12 |
| 2018/0192268 | A1* | 7/2018 | Xu | H04W 4/44 |
| 2018/0218226 | A1* | 8/2018 | Wellington | G06K 9/00825 |
| 2018/0239361 | A1* | 8/2018 | Micks | G06K 9/3233 |
| 2018/0257660 | A1* | 9/2018 | Ibrahim | G08G 1/163 |
| 2018/0308360 | A1* | 10/2018 | Regmi | G08G 1/162 |
| 2018/0328750 | A1* | 11/2018 | Yun | B62D 15/0285 |
| 2018/0329418 | A1* | 11/2018 | Baalke | G06Q 50/28 |
| 2018/0364725 | A1* | 12/2018 | Lonari | B60W 10/06 |
| 2018/0376305 | A1* | 12/2018 | Ramalho de Oliveira | G08G 1/096775 |
| 2018/0376485 | A1* | 12/2018 | Kahtava | H04W 4/44 |
| 2019/0068434 | A1* | 2/2019 | Moreira da Mota | G05D 1/0287 |
| 2019/0088125 | A1* | 3/2019 | Park | G08G 1/166 |
| 2019/0096260 | A1* | 3/2019 | Ahn | G08G 1/162 |
| 2019/0113353 | A1* | 4/2019 | Shimizu | G05D 1/0061 |
| 2019/0294167 | A1* | 9/2019 | Kutila | B60W 30/0956 |
| 2019/0333380 | A1* | 10/2019 | Kobayashi | G08G 1/0129 |
| 2019/0369643 | A1* | 12/2019 | Jeon | B60W 30/182 |
| 2020/0004268 | A1* | 1/2020 | Park | G06K 9/00805 |
| 2020/0047771 | A1* | 2/2020 | Yoon | B60W 30/18159 |
| 2020/0124432 | A1* | 4/2020 | Heap | G01C 21/3469 |

FOREIGN PATENT DOCUMENTS

| | | |
|---|---|---|
| JP | 2007106198 | 4/2007 |
| JP | 2011129118 | 6/2011 |
| JP | 2017-019421 | 1/2017 |
| KR | 1020120101844 | 9/2012 |

OTHER PUBLICATIONS

"Autonomous vehicles. The legal landscape in the US and Germany," Norton Rose Fulbright, XP055499746, Jul. 2016, 58 pages.

* cited by examiner

VEHICLE CONTROL DEVICE MOUNTED ON VEHICLE AND METHOD FOR CONTROLLING THE VEHICLE

CROSS-REFERENCE TO RELATED APPLICATION

This application claims an earlier filing date and the right of priority to Korean Patent Application No. 10-2017-0088021, filed on Jul. 11, 2017, the contents of which are incorporated herein by reference in its entirety.

TECHNICAL FIELD

This present disclosure relates to a vehicle control device provided in a vehicle and a control method of the vehicle.

BACKGROUND

A vehicle is an apparatus capable of moving a user in the user-desired direction, and a typical example is a car.

Various types of sensors and electronic devices can be provided in a vehicle for convenience of a user using the vehicle. Various studies on Advanced Driver Assistance System (ADAS) are being actively undertaken. In addition, autonomous vehicles are under active development.

A vehicle may perform communications with various devices capable of communicating with the vehicle for a smooth autonomous driving. For example, the vehicle may perform communication with mobile terminals, servers, other vehicles, and road infrastructures. This may be referred to as a V2X (Vehicle to everything) communication. The V2X communication may be generally defined as technology for exchanging or sharing information such as a traffic situation with the road infrastructures and other vehicles while driving.

A V2V (Vehicle to Vehicle) communication may be understood as a type of V2X communication. For example, a vehicle may perform communication with neighboring vehicles (or other vehicles), and this may be referred to as a V2V communication. The V2V communication may be generally defined as a technology for exchanging information among vehicles, and may include sharing the position and speed information of the neighboring vehicles.

Based on the V2X technology, a vehicle may receive a large amount of data for controlling a vehicle. For instance, it is possible to receive V2X data from various sources such as other vehicles located within a predetermined range based on the vehicle, a mobile terminal of a pedestrian, and a traffic light. Further, as 5G communication networks are deployed, it may be possible to transmit large amount of data in an expeditious manner.

SUMMARY

In one aspect, a vehicle control device for a vehicle includes: a communication unit configured to receive vehicle-to-everything (V2X) information, the V2X information including position data; and a control unit configured to generate a control signal associated with driving of the vehicle based on the V2X information. The control unit generates the control signal associated with driving of the vehicle by: determining an expected driving route of the vehicle; based on the determination of the expected driving route of the vehicle, determining a region of interest; and based on the determination of the region of interest, selectively receiving first V2X information associated with the region of interest by: transmitting, through the communication unit, a request for transmission of the first V2X information associated with the region of interest to communication-enabled devices; and receiving, through the communication unit, the first V2X information transmitted by the communication-enabled devices.

Implementations may include one or more of the following features. For example, the control unit is configured to determine the expected driving route of the vehicle based on at least one of a turn indicator lamp status, route information, manipulation of a steering wheel of the vehicle, or lane information of a road currently travelled by the vehicle.

In some implementations, the control unit is configured to determine the region of interest based on traffic signal information associated with an intersection corresponding to a location of the vehicle.

In some implementations, the control unit is configured to: determine that the expected driving route of the vehicle includes changing a driving lane of the vehicle to another lane; based on the determination that the expected driving route of the vehicle includes changing the driving lane of the vehicle to another lane, include at least a portion of the other lane in the region of interest; based on the first V2X information, calculate an entry time configured to reduce risk of collision with another vehicle driving on the other lane; and based on the calculated entry time, generate a control signal configured to switch the driving lane of the vehicle to the other lane.

In some implementations, the control unit is configured to: determine that the expected driving route of the vehicle includes entering an intersection; based on the determination that the expected driving route of the vehicle includes entering the intersection, include the intersection in the region of interest; based on the determination that the expected driving route of the vehicle includes entering an intersection, determine that the first V2X information includes traffic signal information; based on the determination that the first V2X information includes traffic signal information, determine a waiting time associated with the traffic signal; and based on the waiting time, generate a control signal configured to stop the vehicle for the waiting time.

In some implementations, the control unit is configured to: determine that a first road traveled by the vehicle in entering an intersection includes a first plurality of lanes; based on the expected driving route of the vehicle, determine an exit lane of a second road to be taken by the vehicle upon exiting the intersection; based on (i) the exit lane of the second road to be taken by the vehicle upon exiting the intersection, and (ii) a driving direction of the vehicle, select an entry lane from the first plurality of lanes configured to reduce travel distance through the intersection; and based on selection of the entry lane, generate a control signal configured to drive the vehicle to the selected entry lane.

In some implementations, the control unit is configured to: based on the traffic signal information and information associated with other vehicles in the region of interest, determining a risk of collision with the other vehicles within the intersection; based on the determined risk of collision, determine an entry time for entering the intersection; and based on the determination of the entry time, generate a control signal configured to drive the vehicle into the intersection.

In some implementations, the control unit is configured to: determine that the expected driving route of the vehicle includes entering an exit ramp branching from a road currently traveled by the vehicle; based on the determination that the expected driving route of the vehicle includes entering the exit ramp, include the exit ramp in the region of interest; based on the first V2X information, determine at least one of traffic congestion situations of the road or the exit ramp; and based on the at least one of the traffic congestion situations of the road or the exit ramp, generate a control signal configured to drive the vehicle to the exit ramp.

In some implementations, the control unit is configured to generate the control signal configured to drive the vehicle to the exit ramp by: based on the at least one of the traffic congestion situations of the road or the exit ramp, calculating a first driving route from a current location of the vehicle to the exit ramp configured to reduce travel time; and based on the calculated first driving route, generating the control signal configured to drive the vehicle to the exit ramp.

In some implementations, the control unit is configured to: determine that the first driving route of the vehicle includes changing a driving lane of the vehicle to another lane; based on the determination that the first driving route of the vehicle includes changing the driving lane of the vehicle to another lane, include at least a portion of the other lane in the region of interest; based on the first V2X information, calculate an entry time configured to reduce risk of collision with another vehicle driving on the other lane; and based on the calculated entry time, generate a control signal configured to switch the driving lane of the vehicle to the other lane.

In some implementations, the control unit is configured to: based on the first V2X information, calculate a first speed configured to reduce travel time of the first driving route; and generate a control signal configured to drive the vehicle at the first speed.

In some implementations, the control unit is configured to: based on the first V2X information, determine that the vehicle is unable to enter the exit ramp according to the control signal configured to drive the vehicle to the exit ramp; and based on the determination that the vehicle is unable to enter the exit ramp, determine an alternate route In some implementations, the control unit is configured to: determine that the expected driving route of the vehicle includes entering an intersection; determine that a left turn indicator lamp or a right turn indicator lamp is on; based on the determination that a left turn indicator lamp or a right turn indicator lamp is on, classify roads associated with the intersection into a first group by: determining, based on information associated with the intersection, first potential driving routes of other vehicles entering the intersection; classifying the first potential driving routes that overlaps with the expected driving route of the vehicle into second potential driving routes; and classifying into the first group, (i) roads associated with the expected driving route of the vehicle, and (ii) roads associated with the second potential driving routes; and include the first group of roads in the region of interest.

In another aspect, a vehicle control device for a vehicle includes: a communication unit configured to receive vehicle-to-everything (V2X) information, the V2X information including position data; and a control unit configured to generate a control signal associated with driving of the vehicle based on the V2X information. The control unit generates the control signal associated with driving of the vehicle by: determining an expected driving route of the vehicle; based on the determination of the expected driving route of the vehicle, determining a region of interest; and based on the determination of the region of interest, receiving first V2X information associated with the region of interest by: receiving, through the communication unit, available V2X information; determining that the position data of the received V2X information is within the region of interest; based on the determination that the position data of the received V2X information is within the region of interest, classifying the received V2X information as the first V2X information; and performing one or more of: processing the first V2X information; and displaying, through a display unit of the vehicle, the first V2X information.

Implementations may include one or more of the following features. For example, the control unit is configured to determine the expected driving route of the vehicle based on at least one of a turn indicator lamp status, route information, manipulation of a steering wheel of the vehicle, or lane information of a road currently travelled by the vehicle.

In some implementations, the control unit is configured to: determine that the expected driving route of the vehicle includes entering an intersection; determine that a left turn indicator lamp or a right turn indicator lamp is on; based on the determination that a left turn indicator lamp or a right turn indicator lamp is on, classify roads associated with the intersection into a first group by: determining, based on information associated with the intersection, first potential driving routes of other vehicles entering the intersection; classifying the first potential driving routes that overlaps with the expected driving route of the vehicle into second potential driving routes; and classifying into the first group, (i) roads associated with the expected driving route of the vehicle, and (ii) roads associated with the second potential driving routes; and include the first group of roads in the region of interest.

In some implementations, the control unit is configured to: determine that the expected driving route of the vehicle includes entering an intersection; based on the determination that the expected driving route of the vehicle includes entering the intersection, include the intersection in the region of interest; based on the determination that the expected driving route of the vehicle includes entering an intersection, determine that the first V2X information includes traffic signal information; based on the determination that the first V2X information includes traffic signal information, determine a waiting time associated with the traffic signal; and based on the waiting time, generate a control signal configured to stop the vehicle for the waiting time.

In another aspect, a method of controlling a vehicle includes: determining an expected driving route of the vehicle; based on the determination of the expected driving route of the vehicle, determining a region of interest; and based on the determination of the region of interest, selectively receiving, through a communication unit configured to receive vehicle-to-everything (V2X) information, first V2X information associated with the region of interest by: transmitting, through the communication unit, a request for transmission of the first V2X information associated with the region of interest to communication-enabled devices; and receiving, through the communication unit, the first V2X information transmitted by the communication-enabled devices; and based on the first V2X information, generating a control signal associated with driving of the vehicle.

Implementations may include one or more of the following features. For example, the method includes: determining that the expected driving route of the vehicle includes entering an intersection; determining that a left turn indicator lamp or a right turn indicator lamp is on; based on the determination that a left turn indicator lamp or a right turn indicator lamp is on, classifying roads associated with the intersection into a first group by: determining, based on information associated with the intersection, first potential driving routes of other vehicles entering the intersection; classifying the first potential driving routes that overlaps with the expected driving route of the vehicle into second potential driving routes; and classifying into the first group, (i) roads associated with the expected driving route of the vehicle, and (ii) roads associated with the second potential driving routes; and including the first group of roads in the region of interest.

In some implementations, the method includes: determining that the expected driving route of the vehicle includes entering an intersection; based on the determination that the expected driving route of the vehicle includes entering the intersection, including the intersection in the region of interest; based on the determination that the expected driving route of the vehicle includes entering an intersection, determining that the V2X information includes traffic signal information; based on the determination that the V2X information includes traffic signal information, determining a waiting time associated with the traffic signal; and based on the waiting time, generating a control signal configured to stop the vehicle for the waiting time.

In another aspect, a vehicle control device for a vehicle includes: a communication unit configured to receive vehicle-to-everything (V2X) information, the V2X information including position data; and a control unit configured to generate a control signal associated with driving of the vehicle based on the V2X information. The control unit generates the control signal associated with driving of the vehicle by: determining an expected driving route of the vehicle; based on the determination of the expected driving route of the vehicle, determining a region of interest; and based on the determination of the region of interest, selectively receiving first V2X information associated with the region of interest by: receiving, through the communication unit, a portion of available V2X information, the portion including position data; determining that the position data of the available V2X information is within the region of interest; and based on the determination that the position data of the available V2X information is within the region of interest, receiving the first V2X information by receiving a remaining portion of the available V2X information.

In some scenarios, according to some implementations of the present disclosure, one or more of the following effects may be achieved.

First, it may be possible to alleviate problems associated with large amounts of V2X data, such as shortage of memory, time delay, and increase in communication cost, by selecting data or prioritizing the receiving and/or processing of the data based on a region of interest.

Second, efficiency and accuracy of autonomous driving may be improved by receiving and utilizing only the data pertinent to controlling of the vehicle among data received from various communications environment.

Third, by reducing the amount of received and/or processed data, risk of missed data due to excessive data flow may be reduced.

Fourth, information that is important for controlling the vehicle can be selectively or preferentially received based on considerations of the driving situation and environment, including the property of the road.

Fifth, by selectively or preferentially receiving information that is pertinent to driving of the vehicle, unnecessary receiving of information and associated consumption of communication bandwidth may be avoided.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

V2X communication can provide a vehicle with a large amount of data, some of which might be necessary for controlling the vehicle, but some of which might not be necessary. There are several potential issues that can arise from receiving a large amount of data. For example, the vehicle or a vehicle control device may experience a shortage of memory. As another example, receiving of information critical for driving may be delayed due to time needed in receiving and/or processing preceding information. As yet another example, excessive communication cost may be incurred or excessive bandwidth may be consumed. Further, the vehicle control device may experience heavy processing load, which may adversely affect real-time operation or reliability of the device. As such, various implementations of the vehicle control device and method for controlling the vehicle are described herein that may address one or more of such issues.

A vehicle in some implementations of the present disclosure may include cars, motorcycles and the like. Hereinafter, the vehicle will be described based on a car.

The vehicle according to the implementation of the present disclosure may be an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
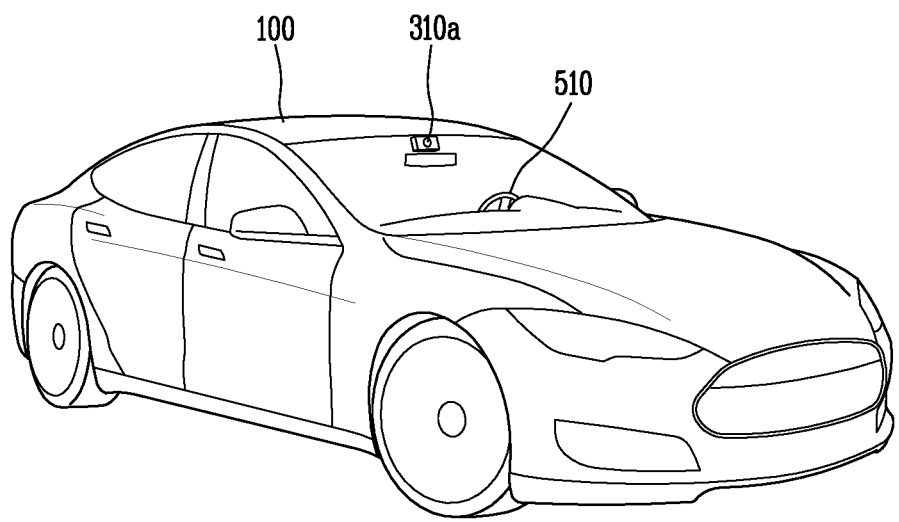
FIG. 1 is a diagram illustrating an example of an exterior of a vehicle.
Figure 1:
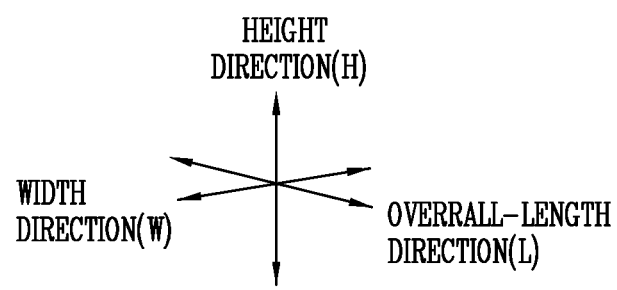
Figure 2:
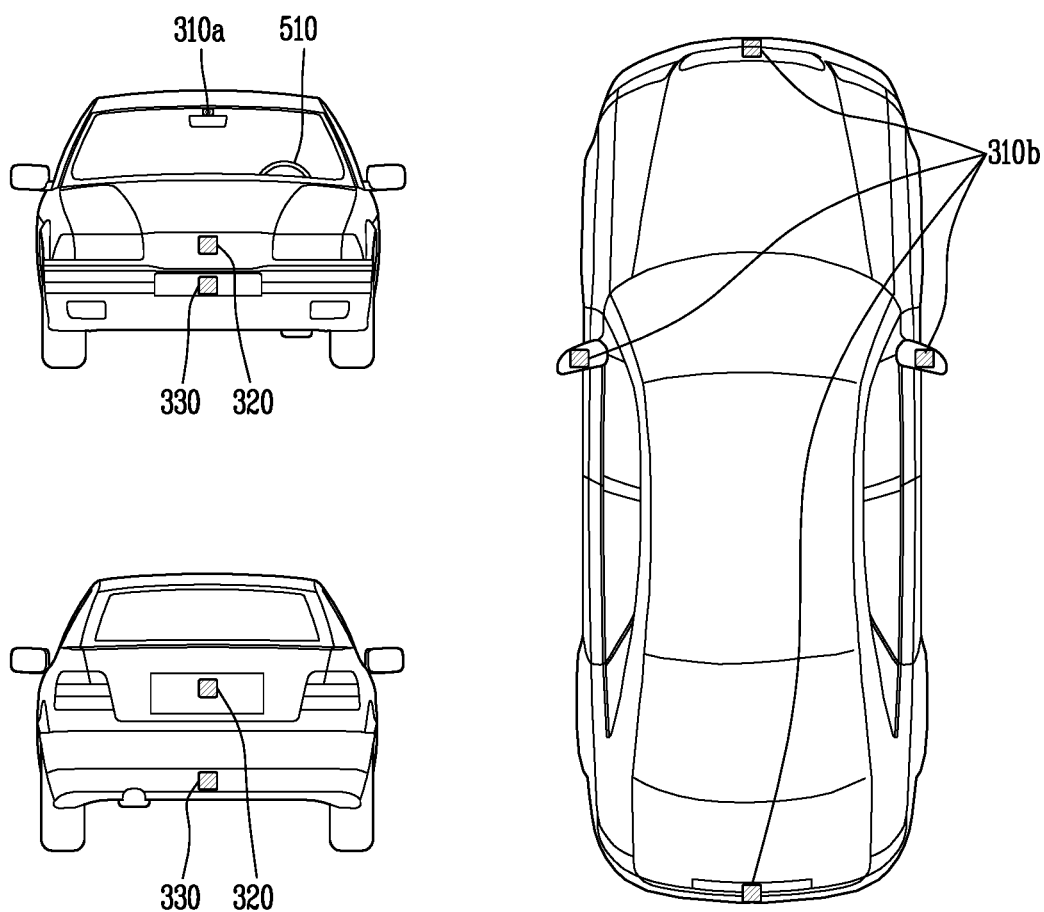
FIG. 2 is a diagram illustrating an example of a vehicle at various angles.
Figure 3:
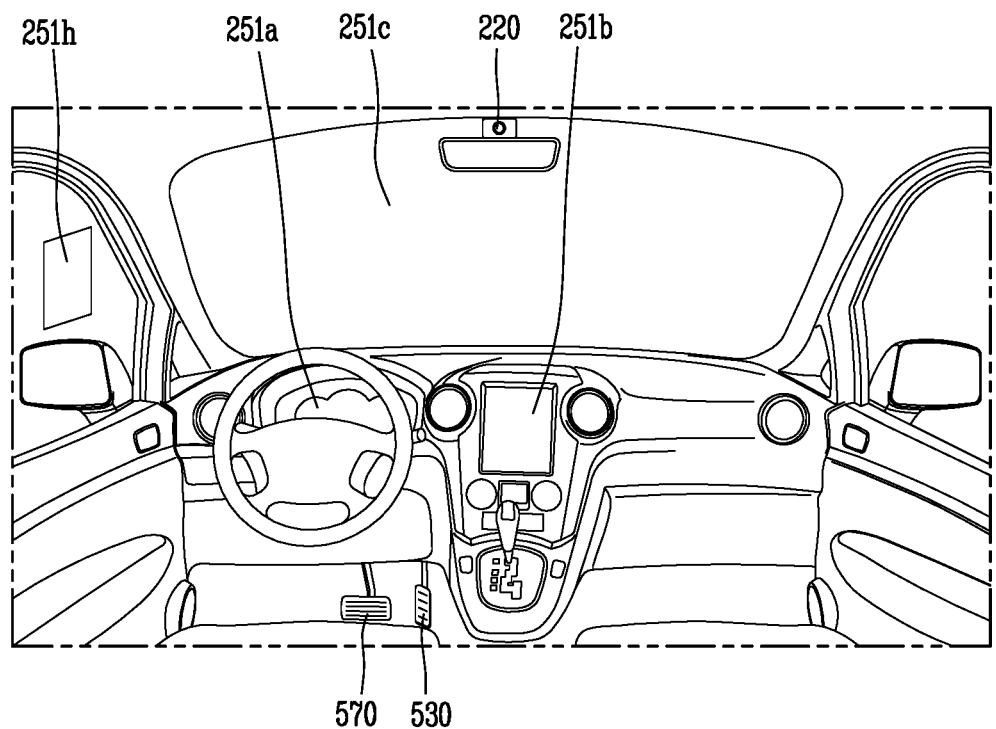
FIGS. 3 and 4 are views illustrating an interior portion of an example of a vehicle.
Figure 4:
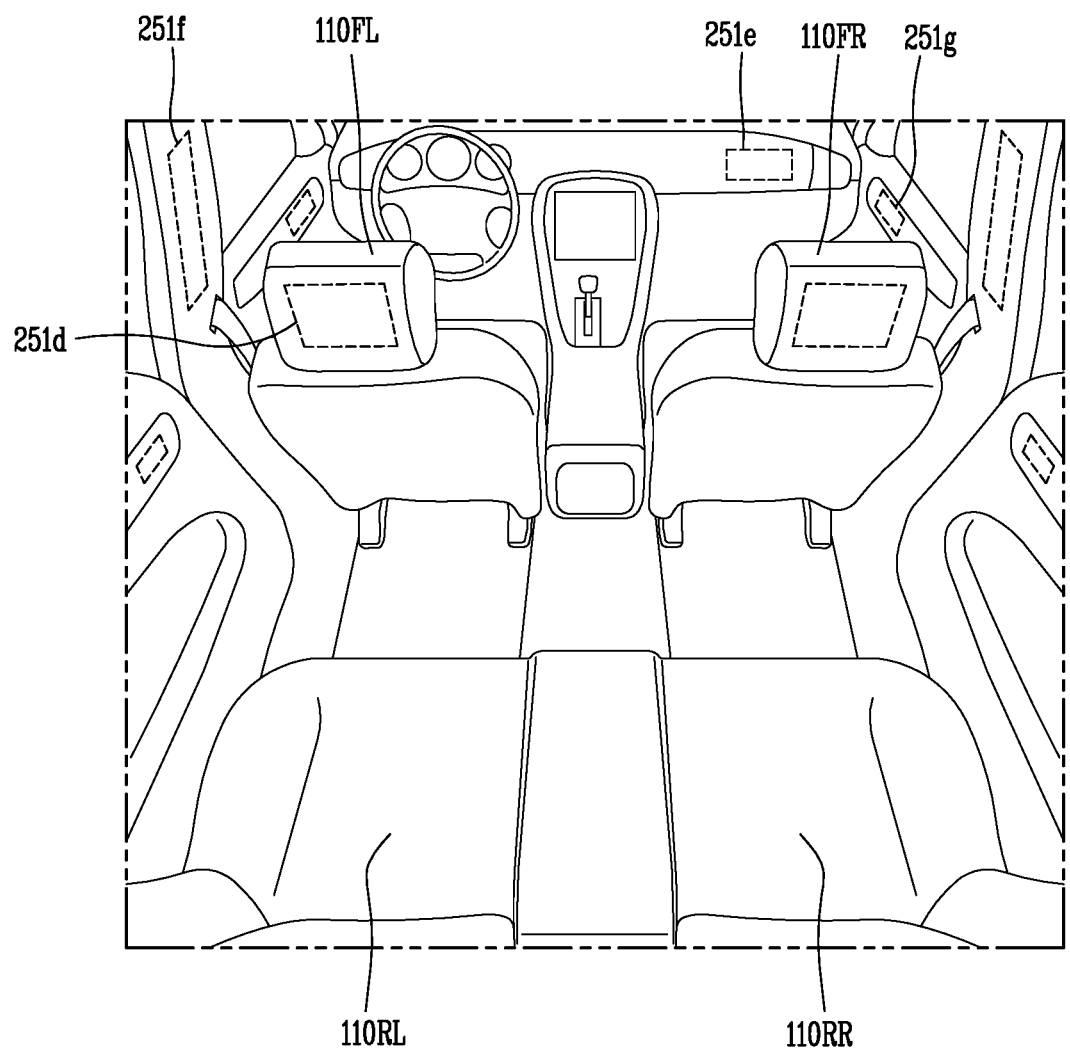

FIG. 1 illustrates an example of an exterior of a vehicle; FIG. 2 illustrates an example of a vehicle at various angles; and FIGS. 3 and 4 illustrate an interior portion of an example of a vehicle.

Figure 5:
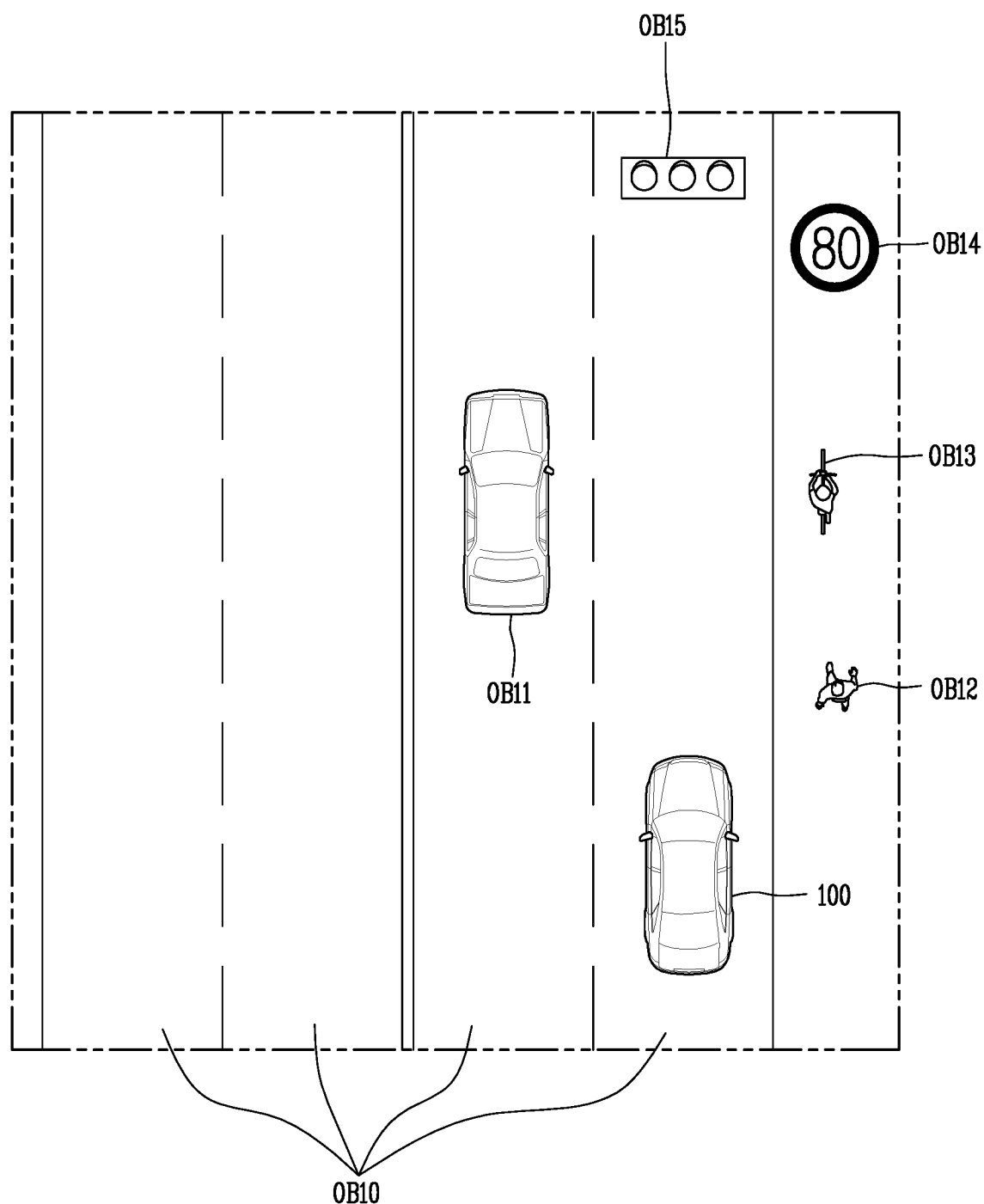
FIGS. 5 and 6 are reference views illustrating examples of objects that are relevant to driving.
Figure 6:
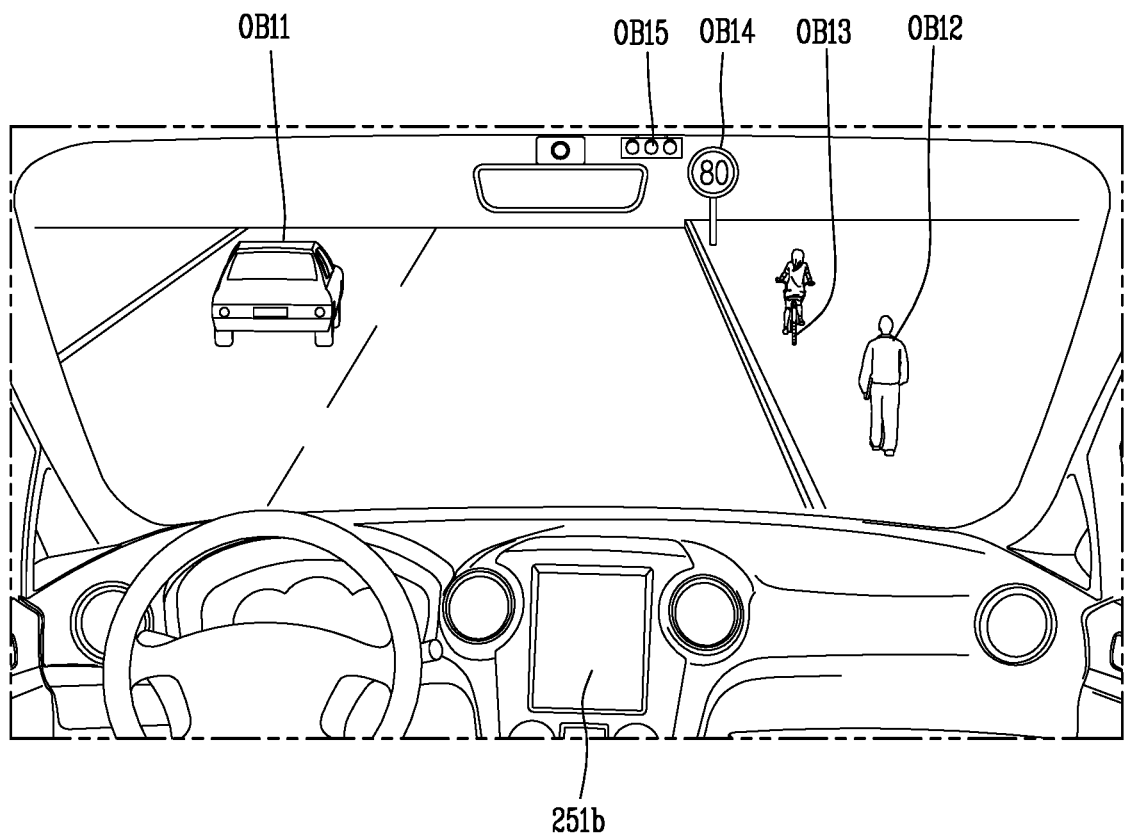
Figure 7:
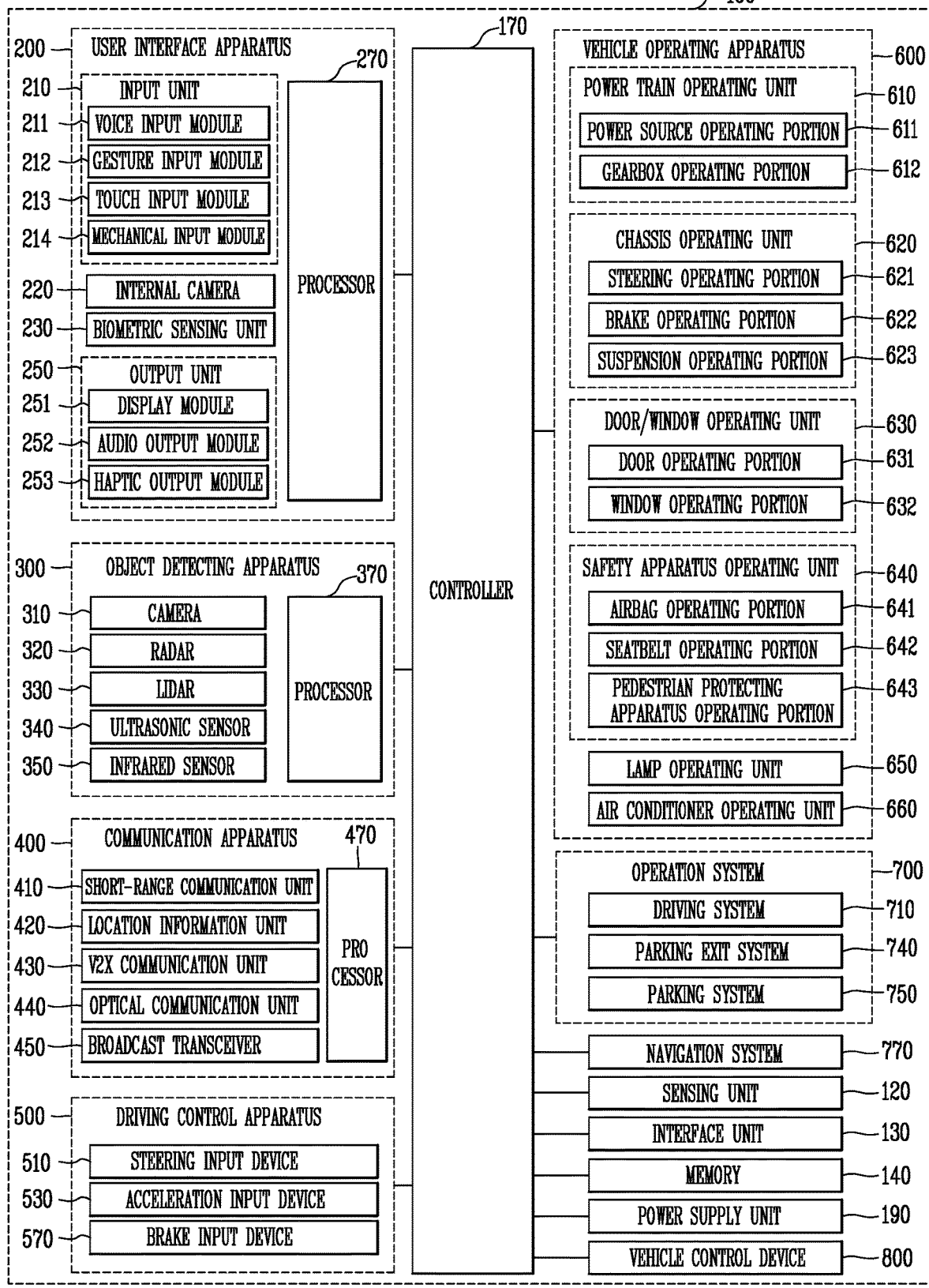
FIG. 7 is a block diagram illustrating subsystems of an example of a vehicle.

FIGS. 5 and 6 illustrate examples of objects that are relevant to driving; and FIG. 7 illustrate subsystems of an example of a vehicle.

As illustrated in FIG. 1 through 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided by an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, at least one processor such as a controller 170 and a power supply unit 190.

In some implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and at least one processor, such as processor 270.

In some implementations, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

In some implementations, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

In some implementations, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

In some implementations, the user interface apparatus 200 may include a plurality of display modules 251*a* through 251*g*.

The display module 251 may be disposed on one area of a steering wheel, one area 521*a*, 251*b*, 251*e* of an instrument panel, one area 251*d* of a seat, one area 251*f* of each pillar, one area 251*g* of a door, one area of a center console, one area of a headlining or one area of a sun visor, or implemented on one area 251*c* of a windshield or one area 251*h* of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

In some implementations, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

In some implementations, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may include, for example, left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated by a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

In some implementations, objects may be classified into a moving object and a fixed object. For example, the moving object may include another vehicle and a pedestrian. The fixed object may, for example, a traffic signal, a road and a structure.

The object detecting apparatus 300 may include a camera 310, a radar 320, a LiDAR 330, an ultrasonic sensor 340, an infrared sensor 350 and a processor 370.

In some implementations, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keying (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

In some implementations, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and at least one processor, such as a processor 470.

In some implementations, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

In some implementations, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

In some implementations, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

In some implementations, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving direction of the vehicle 100 from the user. The steering input device 510 is preferably configured in the form of a wheel allowing a steering input in a rotating manner. According to some implementations, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some implementations, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some implementations, the vehicle operating apparatus 600 may further include other components in addition to the components described, or may not include some of the components described.

In some implementations, the vehicle operating apparatus 600 may include at least one processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, when a fossil fuel-based engine is used as the power source, the power source operating portion 611 may perform an electronic control for the engine. Accordingly, an output torque and the like of the engine can be controlled. The power source operating portion 611 may adjust the engine output torque according to the control of the controller 170.

For example, when an electric energy-based motor is used as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

In some implementations, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

In some implementations, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In some implementations, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include at least one processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

In some implementations, the operation system 700 may further include other components in addition to components to be described, or may not include some of the components to be described.

In some implementations, the operation system 700 may include at least one processor. For example, each unit of the operation system 700 may individually include a processor.

In some implementations, the operation system may be implemented by the controller 170 in a software configuration.

In some implementations, the operation system 700 may include at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and at least one processor. The memory may store the navigation information. The processor may control an operation of the navigation system 770.

In some implementations, the navigation system 770 may update prestored information by receiving information from an external device through the communication apparatus 400.

In some implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some implementations, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

In some implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

In some implementations, the vehicle 100 according to the present disclosure may include a vehicle control device 800.

The vehicle control device 800 may control at least one of those components illustrated in FIG. 7. As such, in some implementations, the vehicle control device 800 may be the controller 170.

In some other implementations, the vehicle control device 800 may be a separate device, independent of the controller 170. When the vehicle control device 800 is implemented as a component independent of the controller 170, the vehicle control device 800 may be provided on a part of the vehicle 100.

Hereinafter, description will be given of a vehicle control device 800 implemented as a component separate from the controller 170. However, in general, the functions, operations, and control methods described in relation to the vehicle control device 800 may be executed by the controller 170 of the vehicle. For example, every detail described in relation to the vehicle control device 800 may be applied to the controller 170 in the same/like manner.

Also, the vehicle control device 800 described herein may include some of the components illustrated in FIG. 7 and various components included in the vehicle. For the purpose of this disclosure, the components illustrated in FIG. 7 and the various components included in the vehicle will be described with separate names and reference numerals.

Figure 8:
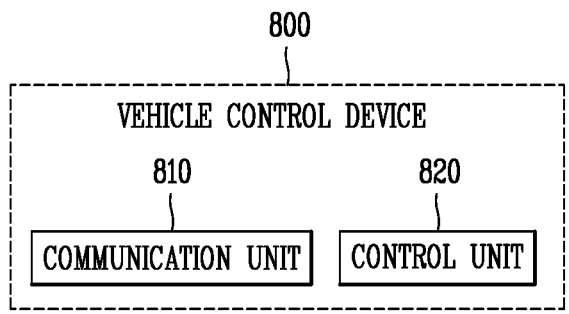
FIG. 8 is a block diagram illustrating an example of a vehicle control device according to some implementations of the present disclosure.

FIG. 8 illustrates a block diagram of an example of vehicle control device. Referring to FIG. 8, the vehicle control device 800 in accordance with the present disclosure may include a communication unit 810 and a control unit 820.

The communication unit 810 may be the communication apparatus 400 described before.

Specifically, the communication unit 810 may perform communications with various communication-enabled devices, such as mobile terminals, servers, other vehicles, road infrastructures, and the like. This may be referred to as a V2X (Vehicle to Everything) communication. The V2X communication may be generally defined as a technology for exchanging and sharing information such as the traffic conditions with the road infrastructures and other vehicles while driving. Information received through V2X communication may be referred to as V2X information.

A V2V (Vehicle to Vehicle) communication may be understood as a type of V2X communication. For example, a vehicle may perform communication with neighboring vehicles (or other vehicles), and this may be referred to as a V2V communication. The V2V communication may be generally defined as a technology for exchanging information among vehicles, and may include sharing the position and speed information of the neighboring vehicles.

The communication unit 810 may be configured to receive V2X information that includes the position data. The position data may be used as an identifying value. For example, the communication unit 810 may have, when receiving the V2X information, the position data related to the corresponding information, and can discriminate the corresponding information based on the position data.

The control unit 820 may be configured to generate a control signal associated with driving of the vehicle, using the received V2X information.

The control unit 820 may set a region of interest based on a driving route that the vehicle is expected to drive ("expected driving route"), and may control the communication unit 810 to selectively receive information that includes position data that falls within the region of interest.

An expected driving route may be obtained, determined, or calculated through various methods based on various factors. For example, the expected driving route may be obtained from a server through V2X communication. As another example, the expected driving route may be determined based on the current heading or travel direction of the vehicle. As yet another example, expected driving route can be based on the set destination of the vehicle. As yet another example, the expected driving route can be obtained from various navigations systems, such as a navigation application of a mobile terminal or the navigation system of the vehicle. As yet another example, the expected driving route can be based on user input to the vehicle, such as steering input, operation of the turn indicator signal. Other examples include use of historical driving data of the user and/or the vehicle. Expected driving route can be determined based on one or more of these methods.

An expected driving route may be obtained, determined, or calculated through various methods based on various inputs from various sensors of the vehicle. For example, a camera of a vehicle can be used to obtain information associated with the driving of the vehicle, such as road surface markings (e.g., lanes, directional markings) and traffic signs. Such obtained information can be used to determine the expected driving route of the vehicle. As another example, a sensor configured to track a preceding vehicle (e.g., LiDAR, ultrasonic sensor, radar, infrared sensor) can be used to obtain information associated with the driving route of the preceding vehicle. The driving route information of the preceding vehicle can be used to determine an expected driving route of the vehicle.

The package of data, or V2X information, exchanged between the communication-enabled devices may include a position, speed, driving direction, or an unexpected event such as a traffic congestion or construction, a slippery road, or the like.

In some implementations, only the information that has been generated in the region of interest, and hence containing a position data that falls within the region of interest, is selectively or preferentially received based on the position value (position data). The region of interest responsible for the selection of the information or determination of the preference may be set based on safety and convenience considerations of vehicle driving.

For example, when a right-turn (left-turn) indicator lamp of a vehicle is turned on, a region located on the right (left) of the vehicle may be set as a region of interest. Based on the region of interest, it is possible to selectively or preferentially receive V2X information from the region of interest, such as information on pedestrians or vehicles on the right (left), or information on the intersection.

As another example, the communication unit 810 may receive the V2X information, and selectively or preferentially process and/or utilize the V2X information that has position data falling within the region of interest. In this case, the communication unit 810 initially receives the V2X information without discriminating based on the position data. Then, the communication unit 810 or the control unit 820 filters the V2X information based on whether a given V2X information has a position data that falls within the region of interest. The communication unit 810 or the control unit 820 can then process and/or utilize the filtered V2X information. Additionally, or alternatively, the communication unit 810 or the control unit 820 can assign a higher priority to the filtered V2X information and assign a lower priority to V2X information that falls outside of the region of interest.

As yet another example, the communication unit 810 may selectively receive only the V2X information that falls within the region of interest. For example, the communication unit 810 may determine whether V2X information has a position data that falls within the region of interest without receiving the full V2X information, by receiving and processing a header of the V2X information containing the position data. When the position data from the header falls within the region of interest, the communication unit 810 proceeds to receive the body of the V2X information. Otherwise, the communication unit 810 terminates receiving of the body of the V2X information. As another example, the communication unit 810 may transmit a request for transmission of V2X information to nearby communication-enabled devices, the request specifying that only V2X information falling within the region of interest be transmitted.

As such, V2X information that falls within the region of interest, which may be considered more important to driving of the vehicle than V2X information that falls outside of the region of interest, may be selectively received, processed, and/or prioritized such that V2X information can be processed in a more efficient manner.

Figure 9:
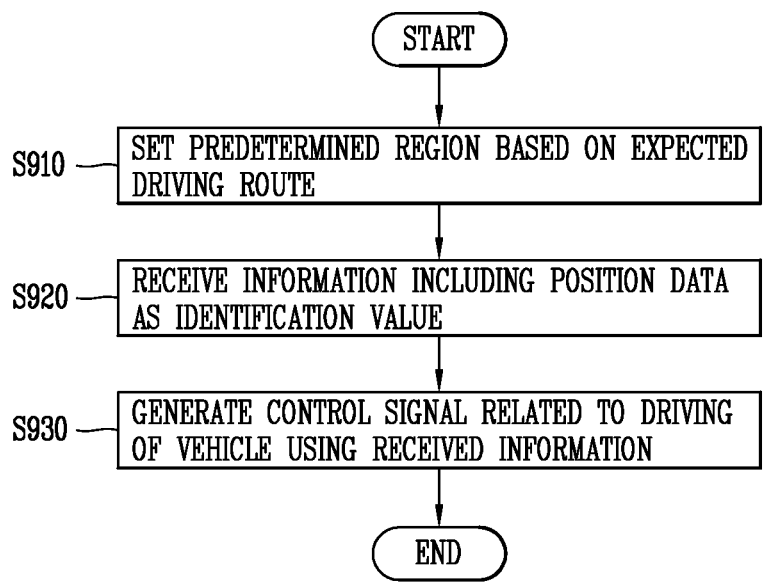
FIG. 9 is a flowchart illustrating a vehicle control method according to some implementations of the present disclosure.

FIG. 9 is a flowchart of a vehicle control method according to some implementations of the present disclosure.

Referring to FIG. 9, a region of interest is set based on an expected driving route of the vehicle (S910).

V2X information including the position data as an identifying value is received (S920). The step S920 may include a step to selectively receive information that includes the position data within the region of interest as the identifying value.

A control signal associated with the driving of the vehicle is generated based on the received V2X information (S930).

In some implementations, the step S930 may include receiving V2X information associated with an object within the region of interest that may be at a risk of collision with the vehicle, and generating a control signal to avoid collision with the object.

The object information may include, for example, other vehicles, pedestrians and other moving objects or animals crossing the road or a crosswalk, facilities such as a guardrail, and obstacles.

In some implementations, the step S910 may include determining that the expected driving route of the vehicle comprises entering an intersection; determining that a left turn indicator lamp or a right turn indicator lamp is on; based on the determination that a left turn indicator lamp or a right turn indicator lamp is on, classifying roads associated with the intersection into a first group by: determining, based on information associated with the intersection, first potential driving routes of other vehicles entering the intersection; classifying the first potential driving routes that overlaps with the expected driving route of the vehicle into second potential driving routes; and classifying into the first group, (i) roads associated with the expected driving route of the vehicle, and (ii) roads associated with the second potential driving routes, and including the first group of roads in the region of interest.

For example, when a right-turn indicator lamp of a vehicle is turned on at an intersection, an entry lane where the vehicle may enter following the right-turn indicator lamp may be detected or determined by the vehicle. Based on information associated with the intersection, first potential driving routes of other vehicles entering the intersection may be determined. For example, referring to FIG. 10, first potential driving routes of other vehicles 1010, 1020, and 1030 are shown by respective arrows.

Examples of information associated with the intersection include intersection configuration information (e.g., 3-way intersection, 4-way intersection), number of lanes of the road connected with the intersection, traffic signals information (e.g., presence of a left/right turn traffic signal, traffic signal pattern), and historical or standard traffic pattern within the intersection.

The first potential driving routes that overlaps with the expected driving route of the vehicle are classified into second potential driving routes. For example, the potential driving routes of the other vehicles 1010, 1020, and 1030 overlap with the expected driving route of the vehicle 100 marked by a wide arrow. As such, these first potential driving routes are classified into second potential driving routes.

Roads associated with the expected driving route of the vehicle, and roads associated with the second potential driving routes are classified into the first group of roads. In this example, the roads occupied and potentially travelled by the other vehicles 1010, 1020, 1030, along with the road expected to be travelled by the vehicle 100, is classified into the first group of roads. Subsequently, the first group of roads are included in the region of interest.

In some implementations, the step S910 may include determining or modifying the region of interest based on traffic signal information associated with an intersection corresponding to the location of the vehicle.

As described before, the control unit 820 may determine or set the region of interest based on an expected driving route of the vehicle. In some implementations, the expected driving route may be determined based on at least one of the turn indicator lamp status, route information, and manipulation of a steering wheel of the vehicle, or lane information of the road currently travelled by the vehicle.

In some implementations, the control unit 820 may determine the expected driving route based on turning on of one of the left and right-turn indicator lamps of the vehicle. Accordingly, the left or right region of the vehicle may be set as the region of interest.

In some implementations, the control unit 820 may determine the expected driving route based on the route information of a navigation system or the manipulation of the steering wheel in the left or right of direction.

In some implementations, it may be possible to determine the driving route based on the lane information of a road currently travelled by the vehicle. Examples of such lane information include a cross-shaped intersection, or a Y-shaped branching road.

In some implementations, the control unit 820 may control the communication unit 810 to receive V2X information on other vehicles that may be at a risk for collision with the vehicle, and generate a control signal configured to avoid collision with other vehicles.

In some implementations, the control unit 820 may calculate, when the region of interest includes an intersection, an optimum driving route that may be at a low risk for collision with other vehicles entering into the intersection, and generate a control signal configured to drive the vehicle to the optimum driving route.

In some implementations, the control unit 820 may calculate, when other vehicles are parked or stopped in the region of interest, a driving route to pass the other vehicles, and generate a control signal to drive the vehicle to the driving route.

In some implementations, the control unit 820 may control the communication unit 810 to receive V2X information on pedestrians located in the region of interest which may be at a risk for collision with the vehicle, and generate a control signal configured to avoid collision with the pedestrians. For example, the control unit 820 may generate a control signal to stop the vehicle, based on the crosswalk signal information in the region of interest.

Figure 10:
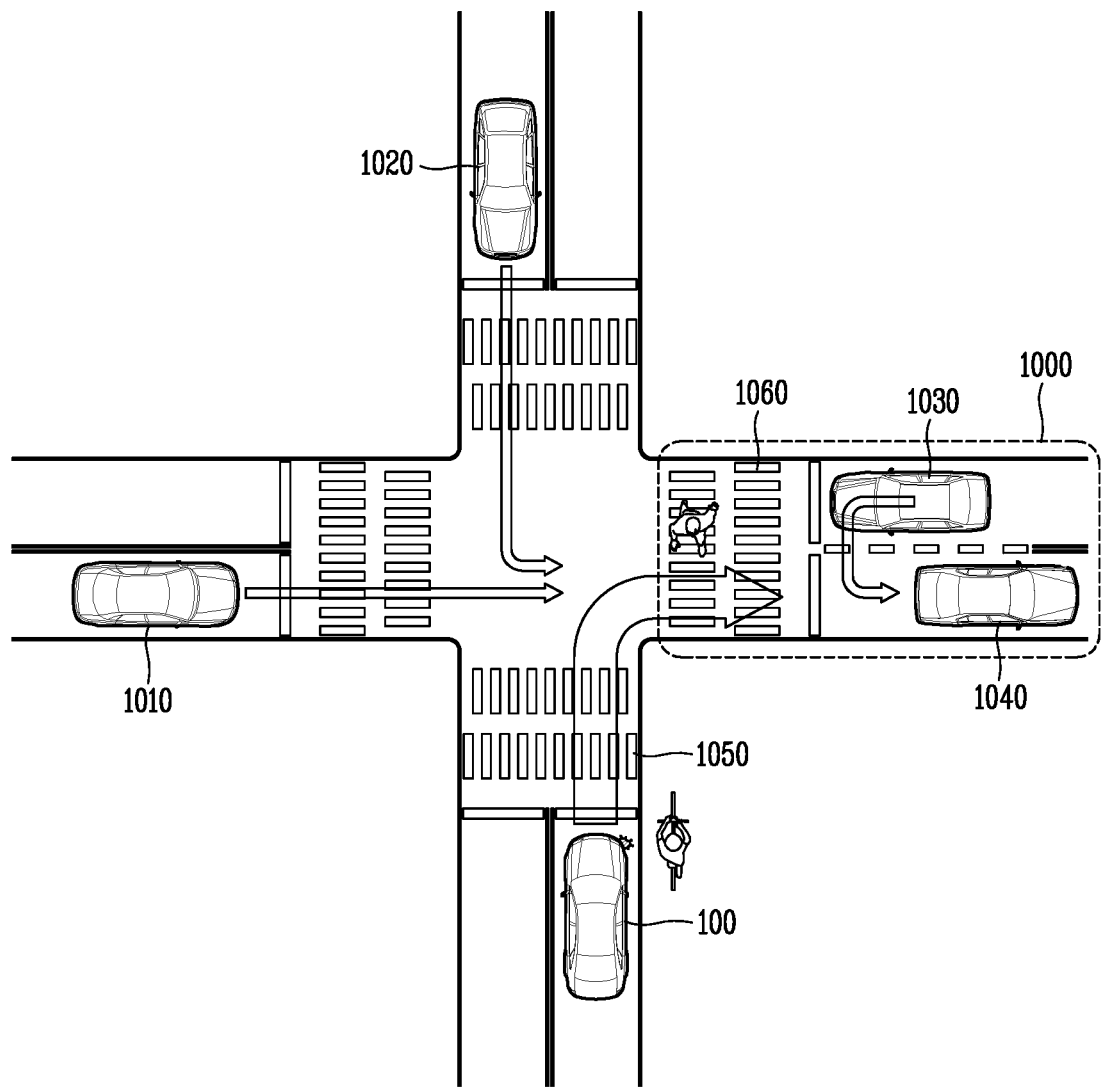
FIG. 10 is a diagram illustrating various examples of V2X information received in case of a vehicle making a right-hand turn at an intersection.

FIG. 10 illustrates various examples of V2X information received in case of vehicle making a right-hand turn at an intersection.

Referring to FIG. 10, the vehicle 100 may be located on the right turn lane at an intersection in right-hand traffic countries, and a right-turn indicator lamp on the right may be turned on. As a result, a region toward the right of the vehicle 100 may be set as a region of interest 1000.

The communication unit 810 may receive V2X information on the right side of the vehicle 100, e.g. V2X information that falls within the region of interest 1000. For example, the V2X information on the region of interest 1000 may include V2X information that includes position data that falls within the region of interest 1000 as an identifying value.

Additionally, the V2X information on the region of interest 1000 may include other information which may influence driving of the vehicle 100 in the region of interest 1000. As such, the V2X information on the region of interest 1000 is not limited to the V2X information generated or existing in the region of interest 1000. For example, the V2X information on the region of interest 1000 may include information on other vehicles that are not currently located within the region of interest 1000, but may later enter the region of interest 1000 within a preset time period.

The region of interest 1000 may be a circle, oval, and quadrangle, or may be composed of various forms such as road shapes (e.g., T-shape, Y-shape) and lanes. For example, the region of interest 1000 may have a circular shape that encompasses a right-turn driving route.

The control unit 820 may provide a notification to a driver based on the received V2X information, and/or generate a control signal to control the vehicle.

In some implementations, the communication unit 810 may receive V2X information associated with a pedestrian located within the region of interest 1000, who may be at a risk of colliding with the vehicle 100 making a right-hand turn.

Based on this V2X information, the control unit 820 may alert a driver of the vehicle 100 of presence of pedestrians (e.g., provide a collision warning), and/or temporarily stop the vehicle 100. Alternatively, or additionally, an autonomous emergency braking (AEB) that automatically operates a brake in accordance with a driving situation may be operated.

In some implementations, the communication unit 810 may receive V2X information associated with a two-wheeled vehicle such as a bicycle, a motorcycle, and the like located within the region of interest 100, which may be at a risk of colliding with the vehicle 100 making a right-hand turn. In response to this V2X information, the control unit 820 may inform the driver of presence of a two-wheeled vehicle (e.g., providing a collision warning), and cause the vehicle 100 to be driven slowly.

In some implementations, the communication unit 810 may receive V2X information associated with other vehicles (e.g., information related to all crossing traffics) located within the region of interest 100, which may be at a risk of colliding with the vehicle 100 making a right-hand turn. For example, the communication unit 810 may receive V2X information on the speed, entry time and route of other vehicles, such as V2X information on vehicle 1010 that passes an intersection by going straight and V2X information on other vehicle 1020 that passes the intersection after making a left turn. As another example, the communication unit 810 may receive V2X information on other vehicles making a U-turn to a right-turn entry lane of the vehicle 100, such as information on the time and speed of the other vehicle 1030 making a U-turn into a right-turn entry lane.

In response, the control unit 820 may calculate an optimum driving route that has a low risk of collision with the other vehicles 1010, 1020 and 1030 that enter into an intersection, and drive the vehicle 100 according to the optimum driving route.

In some implementations, the communication unit 810 may receive traffic signal information of the crosswalks 1050 and 1060 where the vehicle 100 will pass. For example, the communication unit 810 may receive information on current status (e.g., green or red light) of the traffic signal, and a corresponding waiting time. Based on the received information, the control unit 820 may inform the driver of the vehicle 100 of the waiting time, and control the vehicle 100 to wait during the waiting time.

In some implementations, the communication unit 810 may receive V2X information on other vehicles parked or stopped in the region of interest 1000 associated with the right-hand turn route of the vehicle 100.

Based on this V2X information, when a delay or congestion is expected due to a parked or stopped vehicle 1040 on the right-turn route, an alternative route may be calculated, and the vehicle 100 may be driven through the alternative route. For example, the vehicle 100 may enter a different lane (e.g., the second lane from the right) in making the right-hand turn.

In some implementations, the communication unit 810 may receive information on the traffic situations (e.g., congestion) after the right turn, and the control unit 820 may inform the driver of the traffic situations. In this instance, a detour route avoiding the congestion may be suggested.

In some implementations, various warning systems may be used to inform a collision risk with pedestrians, other vehicles or obstacles. Specifically, a belt tightening, a seat vibration (e.g., a left and right eccentric vibration), a steering wheel vibration, a buzzer sound, an active braking, a notification output through a cockpit, or combination thereof may be used.

In some implementations, the control unit 820 may determine the region of interest based on traffic signal information associated with an intersection corresponding to the location of the vehicle.

For example, referring again to FIG. 10, when V2X information of a traffic signal indicating that the first vehicle 1010 may go straight is active is received, and the right-hand turn signal of the vehicle 100 is turned on, a region of interest may be set to include a road where the first vehicle 1010 drives, or is expected to drive.

For another example, when V2X information of a traffic signal indicating that the second vehicle 1020 may go straight is active is received, and the right-hand turn signal of the vehicle 100 is turned on, a region of interest may be set to include a road where the second vehicle 1020 drives, or is expected to drive.

In some implementations, the control unit 820 may control the communication unit 810 to receive traffic signal information to enter the vehicle into the region of interest, and generate a control signal to stop the vehicle for a signal waiting time based on the signal information.

In some implementations, the control unit 820 may select a lane among a plurality of lanes for entering a region of interest to reduce travel distance through the intersection, considering the expected driving route of the vehicle after entering into the region of interest, and generate a control signal to enter the vehicle into the selected lane.

Figure 11:
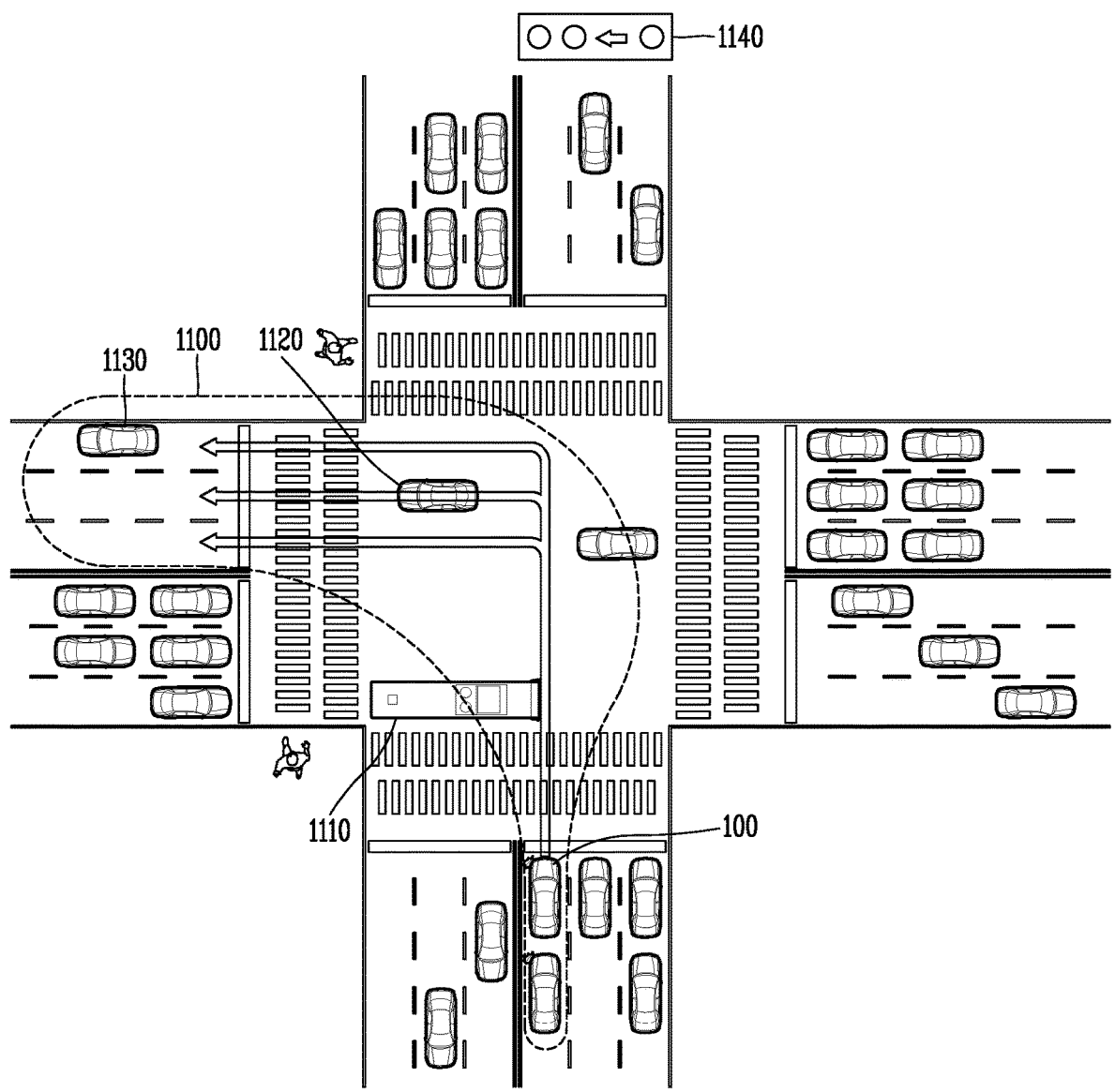
FIG. 11 is a diagram illustrating various examples of V2X information received in case of a vehicle making a left-hand turn at an intersection.

FIG. 11 illustrates various examples of V2X information received in case of a vehicle making a left-hand turn at an intersection.

Referring to FIG. 11, the vehicle 100 may be located at a lane that a left turn is allowed at an intersection in countries with right-hand traffic, and a left-turn indicator lamp may be turned on. Thus, a region toward the left of the vehicle 100 may be set as a region of interest 1100. For example, the region of interest 1100 may be set to include a road where the vehicle 100 makes a left turn.

The communication unit 810 may receive V2X information on the left side of the vehicle 100, e.g. V2X information on the region of interest 1100. For example, the V2X information on the region of interest 1100 may include V2X information that includes position data that falls within the region of interest 1100 as an identifying value, and/or other information that may have an influence on the driving of the vehicle 100 in the region of interest 1100.

The control unit 820 may provide a notification to a driver, and/or generate a control signal to control the vehicle 100, based on the received V2X information. For instance, when the road to be entered after making a left-hand turn has several lanes, an entry lane can be selected to provide an optimum driving route.

In some implementations, the communication unit 810 may receive V2X information associated with pedestrians located within the region of interest 1100, who may be at a risk of collision with the vehicle 100 making a left-hand turn.

Based on this V2X information, the control unit 820 may alert a driver of the vehicle 100 of presence of pedestrians (e.g., provide a collision warning), and/or temporarily stop the vehicle 100. Alternatively, or additionally, an autonomous emergency braking (AEB) that automatically operates a brake in accordance with a driving situation may be operated.

In some implementations, the communication unit 810 may receive V2X information associated with a two-wheeled vehicle such as a bicycle, a motorcycle, and the like located within the region of interest 100, which may be at a risk of colliding with the vehicle 100 making a left-hand turn. In response to this V2X information, the control unit 820 may inform the driver of presence of a two-wheeled vehicle (e.g., providing a collision warning), and cause the vehicle 100 to be driven slowly.

In some implementations, the communication unit 810 may receive V2X information associated with other vehicles (e.g., information related to all crossing traffics) located within the region of interest 100, which may be at a risk of colliding with the vehicle 100 making a left-hand turn. For example, the communication unit 810 may receive V2X information on the speed, entry time and route of other vehicles, such as V2X information on the other vehicle 1110 that maybe illegally stopped within the intersection or passing the intersection by going straight, and V2X information on other vehicle 1020 that enters into the left-turn entry road of the vehicle 100.

In response, the control unit 820 may calculate an optimum driving route that has a low risk of collision with the other vehicles 1110 and 1120 that enter into an intersection, and drive the vehicle 100 according to the optimum driving route.

In some implementations, the communication unit 810 may receive traffic signal information 1140 that the vehicle has to follow in making a left-hand turn. For example, the communication unit 810 may receive information on current status (e.g., green or red light) of the traffic signal, and a corresponding waiting time. Based on the received information, the control unit 820 may inform the driver of the vehicle 100 of the waiting time, and control the vehicle 100 to wait during the waiting time.

In some implementations, the communication unit 810 may receive V2X information on other vehicles parked or stopped in the region of interest 1100 associated with the left-hand turn route of the vehicle 100.

Based on this V2X information, when a delay or congestion is expected due to a parked or stopped vehicle 1130 on the left-hand turn route, an alternative route may be calculated, and the vehicle 100 may be driven through the alternative route. For example, the vehicle 100 may enter a different lane (e.g., the second lane from the right) in making the left-hand turn.

In some implementations, when the expected driving route of the vehicle involves making a right-hand turn after the left-hand turn, the control unit 820 may select the right-most lane as the entry lane such that additional lane changes may be avoided after making the left-hand turn.

In some implementations, various warning systems may be used to inform a collision risk with pedestrians, other vehicles or obstacles. Specifically, a belt tightening, a seat vibration (e.g., a left and right eccentric vibration), a steering wheel vibration, a buzzer sound, an active braking, a notification output through a cockpit, or combination thereof may be used.

In some implementations, the region of interest 1100 may include the lane that the vehicle 100 is intending to switch into, and the control unit 820 may calculate an optimum entry time has a low risk of collision with other vehicles that are driving in the lane, and generate a control signal configured to drive the vehicle into the lane at the optimum entry time.

Figure 12:
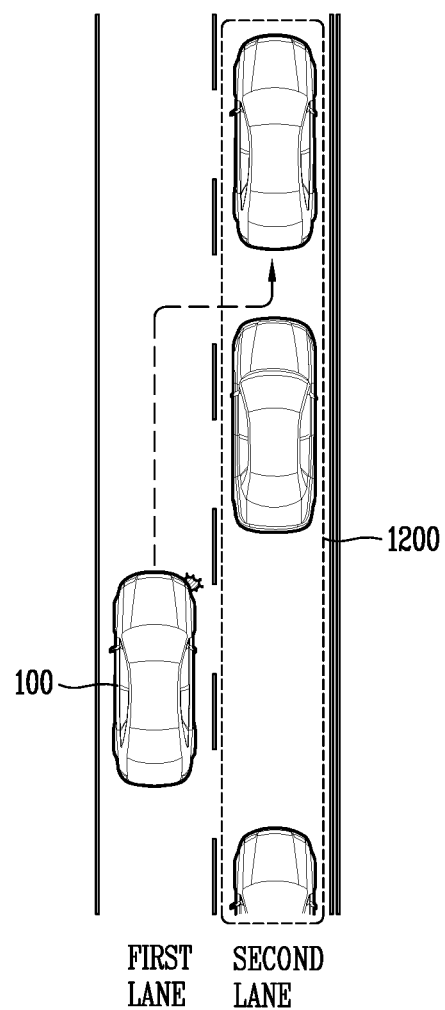
FIG. 12 is a diagram illustrating various examples of V2X information received in case of vehicle making a lane change.

FIG. 12 illustrates various examples of V2X information received in case of vehicle making a lane change;

Referring to FIG. 12, when the vehicle 100 changes the lane from a first lane to a second lane with a right-hand turn signal turned on, the region of interest 1200 may be set to include at least a portion of the second lane road.

For example, the communication unit 810 may receive V2X information associated with other vehicles present in the region of interest 1200 or V2X information on obstacles. Examples of such V2X information include information on the speed, type, collision risk degree of the other vehicle, and a guardrail.

Based on such V2X information, the control unit 820 may calculate an optimum route and entry time to enter into the second lane. As such, the control unit 820 may provide a notification to the user about the entry time, and/or automatically drive the vehicle 100 according to the optimum route.

In some implementations, when a potentially dangerous situation is sensed in changing the lane, various safety systems of the vehicle may be operated. Specifically, when the control unit 820 predicts a collision with a guardrail or other surrounding vehicles on account of various reasons such as a driver's mistake is determined, an evasion assist control system may be operated. For example, a Lane Keeping Assist System (LKAS) or a Lane Departure Warning System (LDWS) may be operated in applicable manners.

The LKAS and LDWS may provide a warning with a voice and/or haptic warning, and/or to directly intervene to stay within the lane, when the vehicle deviates from the currently travelled lane without the driver's intention.

The LKAS and LDWS are typically operated under the condition when the vehicle is moving at a speed greater than a predetermined level, and the turn indicator lamp is turned off. However, when a collision risk is sensed in changing the lane, the LKAS and/or LDWS may be operated so as to stay within the current lane.

In some implementations, based on the V2X information associated with the region of interest 1200, a Lane Change Decision Aid System (LCDAS) may be operated.

In some implementations, when the control unit 820 determines that when it is difficult to follow the originally expected driving route that includes changing of the lane, the control unit 820 may generate a notification in advance notifying the user of the vehicle to such a difficulty. For example, when it is difficult (e.g., when the driving time becomes longer) to perform driving at the original straight route due to vehicles that are waiting for a left-turn in changing the lane to the left, a sound or message to inform in advance this may be output.

In some implementations, based on the V2X information associated with the region of interest 1200, the control unit 820 may provide information of lanes into which the vehicle 100 may switch and update the lanes in real-time within a range that does not deviate from the original expected driving route (e.g., a route calculated by the navigation system). To this end, optimum lane for driving may be proposed based on the lane information above and other factors such as surrounding traffic flows, delays or accident situations.

In some implementations, the control unit 820 may calculate the time that is enterable into the region of interest (e.g., an intersection) based on the traffic signal information, calculate an optimum entry time that has a low risk of collision with other vehicles driving within the region of interest, and generate a control signal configured to drive the vehicle into the region of interest at the entry time.

A left-hand turn at an intersection without a left-hand turn traffic signal ("left turn yield on green") is a traffic flow arrangement that allows a left-hand turn to be made in situations that does not disturb the flow of traffic on the opposing lane, when the traffic signal is turned on to go straight at an intersection without a separate left-hand turn traffic signal. In such an arrangement, when a red signal is turned on, making a left-hand turn is prohibited, and a left-hand turn is allowed only when green signal is on and no vehicles are present on the opposing lane.

Figure 13:
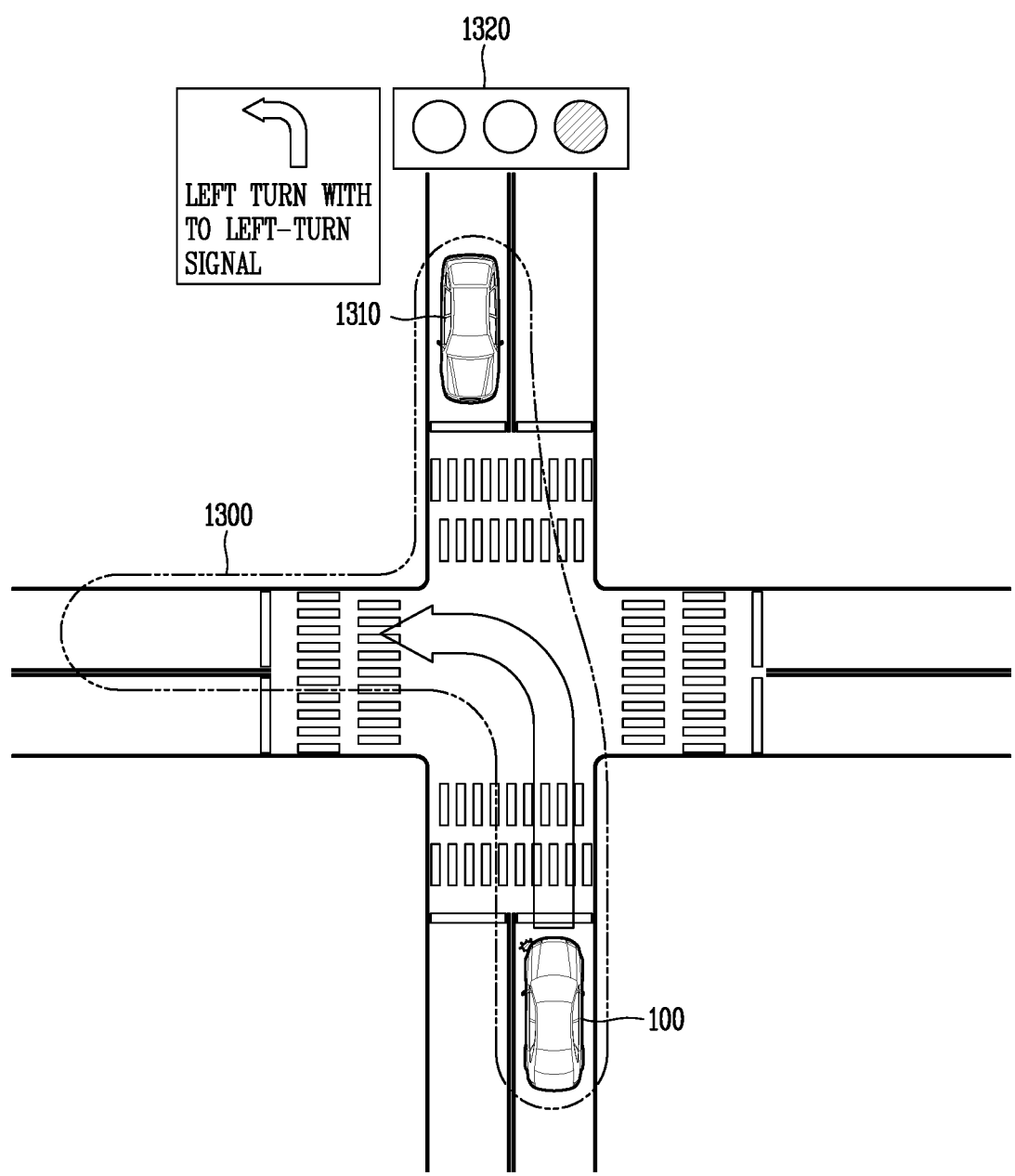
FIG. 13 is a diagram illustrating various examples of V2X information received in case of a vehicle making a left-hand turn without a left-turn traffic signal.

FIG. 13 illustrates various examples of V2X information received in case of a vehicle making a left-hand turn without a left-turn traffic signal.

Referring to FIG. 13, when a vehicle 100 makes a left-hand turn in an intersection that does not have a left-turn traffic signal, the region of interest 1300 may be set to include a left turn entry road and the opposing road, such as the road occupied by the vehicle 1310.

In some implementations, the communication unit 810 may receive one or more of V2X information on presence of an opposing vehicle 1310, V2X information on the speed and route of the opposing vehicle 1310, traffic signal information 1320 on the traffic signal that does not have a left-hand turn signal, and V2X information on the road to be entered after making the left-hand turn, such as presence of other vehicles on the entry road.

Accordingly, when a green signal is turned on and opposing vehicle does not exist, the control unit 820 may allow the vehicle 100 to make the left-hand turn, and/or inform an optimum time to make a left-hand turn to the driver.

In some implementations, when any one of the left or right-turn indicator lamps of the vehicle is turned on at an intersection, the controller 820 may classify the roads included in the intersection into a first group and a second group based on the turned on turn indicator lamp, and set the region of interest to include the roads included in the first group.

In some implementations, when the left and right-hand turn indicator lamps are not turned on, the control unit 820 may set a front region of the vehicle as the region of interest.

Figure 14:
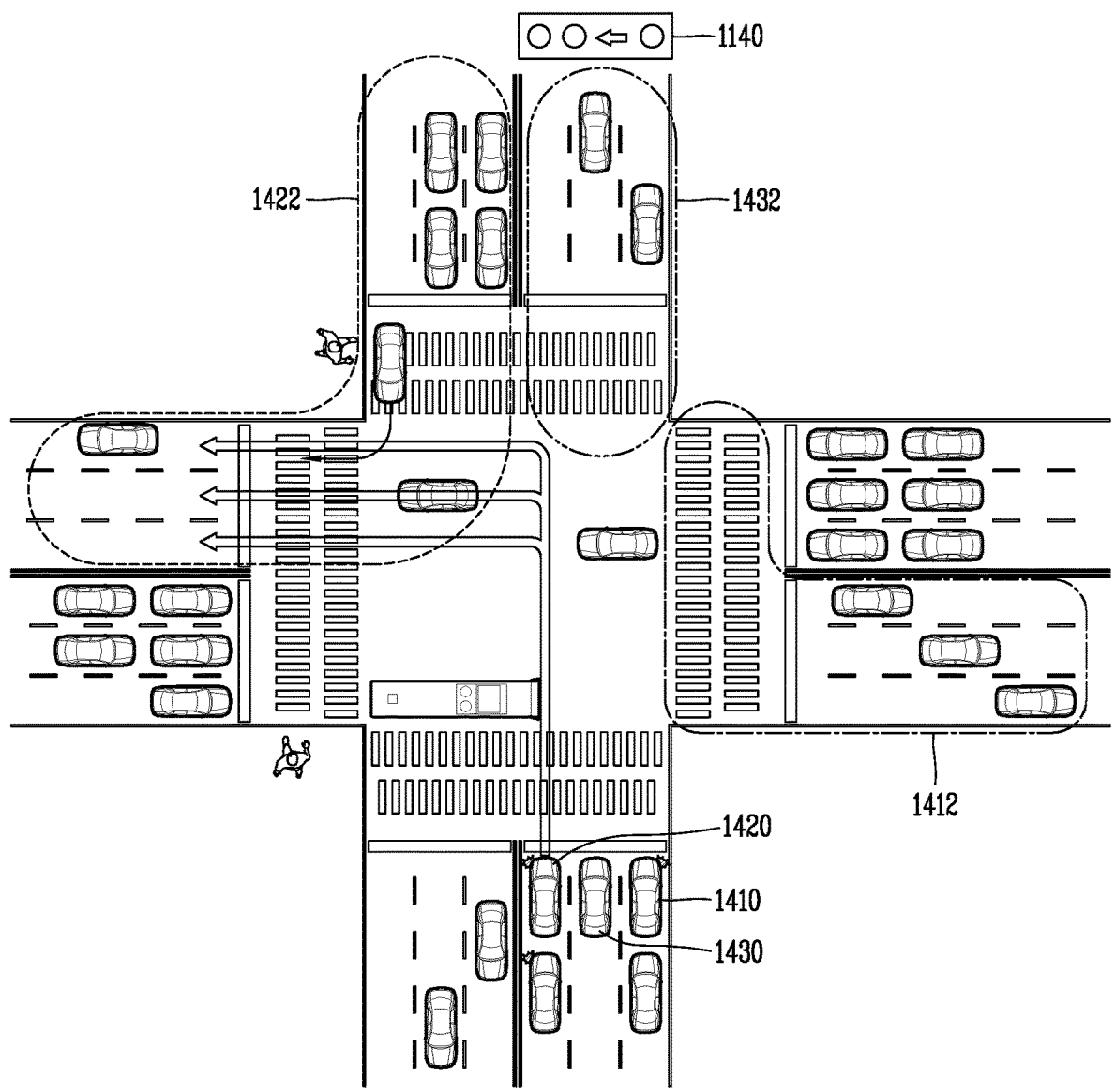
FIG. 14 is a diagram illustrating various examples of V2X information received based on operation of a turn indicator at an intersection.

FIG. 14 illustrates various examples of V2X information received based on operation of a turn indicator at an intersection.

Referring to FIG. 14, when the first vehicle 1410 turns on a right-turn indicator lamp on a right-hand turn lane (e.g., a lane from which a right-hand turn is possible), the roads toward the right side of the first vehicle 1410 may be set as the region of interest 1412. For example, a crosswalk that the first vehicle 1410 passes in making a right-hand turn and the road that the first vehicle 1410 enters may be included in the region of interest 1412. An implementation related to this has been specifically described with reference to FIG. 10.

In some implementations, when the second vehicle 1420 turns on a left-turn indicator lamp on a left-hand turn lane (e.g., a lane from which a left-hand turn is possible), the roads toward the left side of the second vehicle 1420 may be set as the region of interest 1422. For example, a crosswalk that the second vehicle 1420 passes in making a left-hand turn and the road that the second vehicle 1420 enters may be included in the region of interest 1422. Additionally, when another vehicle can enter the intersection or the entry road from the opposite side road, the road at the opposite side may be included in the region of interest 1422.

In some implementations, when a third vehicle 1430 does not turn on the turn indicator lamp, a road continuing straight ahead may be included in the region of interest 1432. In such cases, the communication unit 810 may receive V2X information on the status of the traffic signal, V2X information on the pedestrians that may be at a risk of collision and V2X information on other vehicles, similarly to the case when the left or right-turn indicator lamp is turned on.

based on such V2X information, the control unit 820 may recommend an entry time or a driving route, and/or cause the third vehicle 1430 to be driven slowly or come to a temporary stop.

Accordingly, the region of interest may be set differently according to on/off state of the turn indicator lamp at an intersection and information associated with the intersection (e.g., lane information such as a T-shaped, a cross-shaped, etc.).

Additional implementations related to the present disclosure will now be described.

In some implementations, when a vehicle does not turn on the turn indicator lamp while making a left turn or a right turn, or changing the lane, the turn indicator lamp may be automatically turned on. In this instance, the expected driving route (e.g., route of navigation) may be referred to check the route of the vehicle.

In some implementations, when a driver turns on a right-turn indicator lamp in a state that the vehicle is on a left-turn lane, the control unit 820 may instead control the left-turn indicator lamp to be turned on. Similarly, the expected driving route (e.g., route of navigation) may be referred to check whether or not the vehicle is expected to turn to the left.

In some implementations, when a driver does not turn on a turn indicator lamp in a state that the vehicle is on a right-turn lane, the control unit 820 may automatically turn on the right-turn indicator lamp.

In some implementations, when a vehicle is expected to go straight but the vehicle is on a lane in which both going straight and making a right turn is possible, a rear vehicle that intends to make a right turn may blow a horn. In this instance, the control unit 820 may move the vehicle forward to inform to the rear vehicle that it will go straight.

In some implementations, when the region of interest includes an exit ramp branching off from the road currently travelled by the vehicle, the control unit 820 may generate a control signal configured to drive the vehicle into the exit ramp, considering at least one of the traffic congestion situations of the road and the exit ramp.

In some implementations, the control unit 820 may calculate an optimum driving route for driving the vehicle into the exit ramp at a reduced travel time (e.g., minimum time), considering at least one of the traffic congestion situations of the road and the exit ramp, and generate a control signal to drive the vehicle according to the driving route.

In some implementations, when an expected driving route includes a lane change, the control unit 820 may generate a control signal to change the lane at an optimum time.

In some implementations, the control unit 820 may calculate an optimum speed to drive the expected driving route at a reduced travel time (e.g., minimum time), and generate a control signal to drive the vehicle at the calculated speed.

In some implementations, when the control unit 820 determines that the vehicle is not able to drive into the exit ramp, the control unit 820 may search a new detour route.

Figure 15:
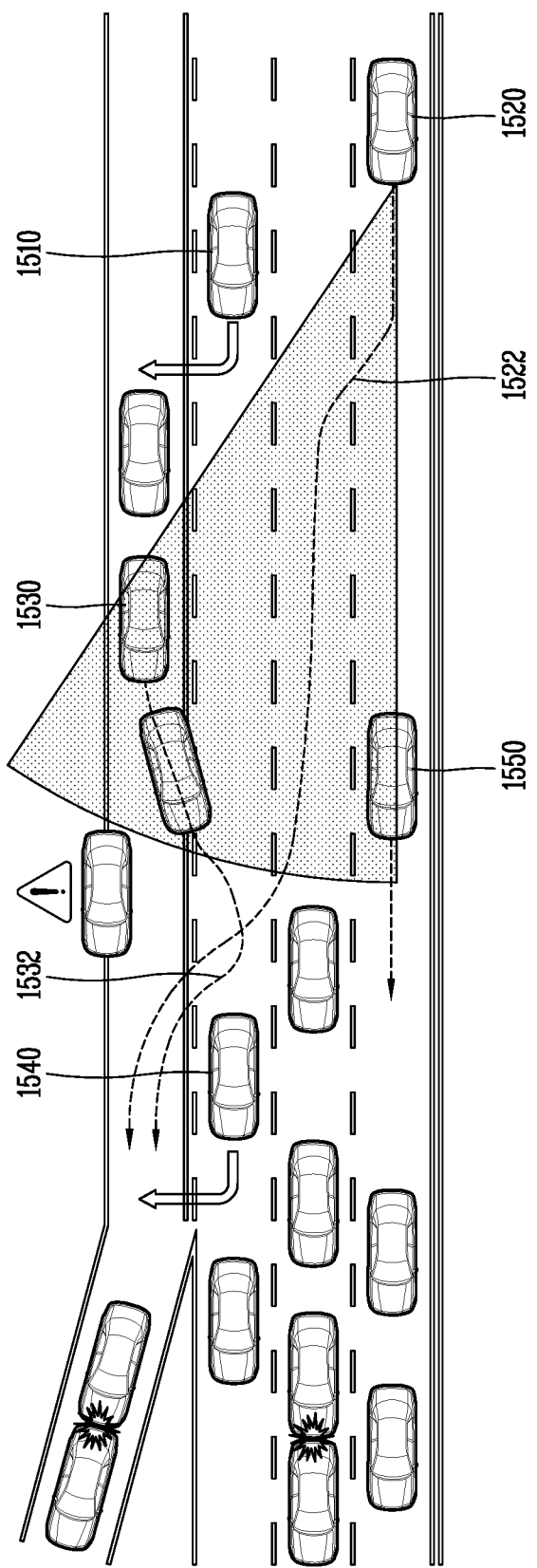
FIG. 15 is a diagram illustrating various examples of V2X information received at an exit ramp of an expressway.

FIG. 15 illustrates various examples of V2X information received at an exit ramp of an expressway.

Referring to FIG. 15, when a vehicle is expected to exit an expressway through an exit ramp, it may be beneficial to consider the traffic congestion situations of both the expressway and the exit ramp. To this end, the region of interest may include the front of the expressway and exit ramp, and the region toward the right side of the vehicle (e.g., toward the exit ramp). Based on the V2X information received from the region of interest, the vehicle may be driven considering the traffic congestion situations.

In some implementations, when a final destination is input to the navigation system, it is possible to obtain V2X information on the road (e.g., traffic congestion situations, etc.) to be entered after branching off based on the expected driving route calculated by the navigation system.

In some implementations, the control unit 820 may determine and notify the vehicle and/or the user of an optimum entry time or speed to enter into the exit ramp, considering the traffic congestion situations of the exit ramp. For example, the control unit 820 may output a notification to drive slowly in entering the exit ramp.

In some implementations, the control unit 820 may determine a time to change the lane or an optimum route 1522 and inform the vehicle and/or the user, considering the traffic congestion situations of the expressway and the exit ramp.

When there is a room in the adjacent lane space for the vehicle to change lane, the lane change may be performed without any change to output of the display unit (e.g., image display device in the vehicle). However, when the currently travelled lane or adjacent lanes are congested, the situations on the flow of the currently travelled lane compared to the adjacent lanes and the reasons for the congestion may be displayed on the display unit.

In some implementations, when a traffic congestion occurs due to an incident (e.g., disabled vehicle) on the exit ramp, a notification to drive into another exit ramp after entry into the expressway may be outputted to the vehicle 1530. A notification may be output at the time of entry into the expressway, or the vehicle 1530 may be autonomously driven through a route 1532 to pass the incident.

In some implementations, when a congestion is generated at an expressway due to a vehicle accident, the control unit 820 may inform the vehicle 1540 of an estimated time for detour by exiting the expressway and rejoining the expressway to bypass the vehicle accident.

In some implementations, when a situation that prevents entering into an exit ramp is sensed, the control unit 820 may drive the vehicle to pass the exit ramp, search for a detour route, and inform the vehicle and/or the user of the detour route.

By using the V2X information, it may be possible to recognize such situations further in advance than using sensors of the vehicle, and suggest a detour route.

Examples of situations that prevent entry into ax exit ramp include insufficient remaining distance to safely enter the exit ramp by changing lanes, increased risk (e.g., beyond a predetermined threshold) of collision in changing lanes to enter the exit ramp, and collision risk due to an approaching vehicle on target switching lane.

The foregoing present disclosure may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include a processor or controller.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A vehicle control device for a vehicle, the vehicle control device comprising:
a transceiver configured to receive vehicle-to-everything (V2X) information, the V2X information comprising position data; and
a controller configured to generate a control signal associated with driving of the vehicle based on the V2X information,
wherein the controller generates the control signal associated with driving of the vehicle by:
determining an expected driving route of the vehicle;
based on the determination of the expected driving route of the vehicle, determining a region of interest; and
based on the determination of the region of interest, selectively receiving first V2X information associated with the region of interest by:
transmitting, through the transceiver, a request for transmission of the first V2X information associated with the region of interest to communication-enabled devices; and
selectively receiving, through the transceiver, the first V2X information transmitted by the communication-enabled devices that includes position data falling within the region of interest,
wherein the controller is further configured to:
determine that the expected driving route of the vehicle comprises entering an intersection;
determine an operation of the vehicle at the intersection; and
determine the region of interest based on (i) the determination that the expected driving route of the vehicle comprises entering an intersection, and (ii) the determined operation of the vehicle.

2. The vehicle control device of claim 1, wherein the controller is configured to determine the expected driving route of the vehicle based on at least one of a turn indicator lamp status, route information, manipulation of a steering wheel of the vehicle, or lane information of a road currently travelled by the vehicle.

3. The vehicle control device of claim 2, wherein the controller is configured to determine the region of interest based on traffic signal information associated with an intersection corresponding to a location of the vehicle.

4. The vehicle control device of claim 2, wherein the controller is configured to:
determine that the expected driving route of the vehicle comprises changing a driving lane of the vehicle to another lane;
based on the determination that the expected driving route of the vehicle comprises changing the driving lane of the vehicle to another lane, include at least a portion of the other lane in the region of interest;

based on the first V2X information, calculate an entry time configured to reduce risk of collision with another vehicle driving on the other lane; and based on the calculated entry time, generate a control signal to switch the driving lane of the vehicle to the other lane.

5. The vehicle control device of claim 1, wherein the controller is configured to:

determine that the expected driving route of the vehicle comprises entering an intersection;

based on the determination that the expected driving route of the vehicle comprises entering the intersection, include the intersection in the region of interest;

based on the determination that the expected driving route of the vehicle comprises entering an intersection, determine that the first V2X information comprises traffic signal information;

based on the determination that the first V2X information comprises traffic signal information, determine a waiting time associated with the traffic signal; and based on the waiting time, generate a control signal to stop the vehicle for the waiting time.

6. The vehicle control device of claim 1, wherein the controller is configured to:

determine that a first road traveled by the vehicle in entering an intersection comprises a first plurality of lanes;

based on the expected driving route of the vehicle, determine an exit lane of a second road to be taken by the vehicle upon exiting the intersection;

based on (i) the exit lane of the second road to be taken by the vehicle upon exiting the intersection, and (ii) a driving direction of the vehicle, select an entry lane from the first plurality of lanes configured to reduce travel distance through the intersection; and based on selection of the entry lane, generate a control signal to drive the vehicle to the selected entry lane.

7. The vehicle control device of claim 5, wherein the controller is configured to:

based on the traffic signal information and information associated with other vehicles in the region of interest, determining a risk of collision with the other vehicles within the intersection;

based on the determined risk of collision, determine an entry time for entering the intersection; and based on the determination of the entry time, generate a control signal to drive the vehicle into the intersection.

8. The vehicle control device of claim 1, wherein the controller is configured to:

determine that the expected driving route of the vehicle comprises entering an exit ramp branching from a road currently traveled by the vehicle;

based on the determination that the expected driving route of the vehicle comprises entering the exit ramp, include the exit ramp in the region of interest;

based on the first V2X information, determine at least one of traffic congestion situations of the road or the exit ramp; and based on the at least one of the traffic congestion situations of the road or the exit ramp, generate a control signal to drive the vehicle to the exit ramp.

9. The vehicle control device of claim 8, wherein the controller is configured to generate the control signal to drive the vehicle to the exit ramp by:

based on the at least one of the traffic congestion situations of the road or the exit ramp, calculating a first driving route from a current location of the vehicle to the exit ramp configured to reduce travel time; and based on the calculated first driving route, generating the control signal to drive the vehicle to the exit ramp.

10. The vehicle control device of claim 9, wherein the controller is configured to:

determine that the first driving route of the vehicle comprises changing a driving lane of the vehicle to another lane;

based on the determination that the first driving route of the vehicle comprises changing the driving lane of the vehicle to another lane, include at least a portion of the other lane in the region of interest;

based on the first V2X information, calculate an entry time configured to reduce risk of collision with another vehicle driving on the other lane; and based on the calculated entry time, generate a control signal to switch the driving lane of the vehicle to the other lane.

11. The vehicle control device of claim 9, wherein the controller is configured to:

based on the first V2X information, calculate a first speed configured to reduce travel time of the first driving route; and generate a control signal to drive the vehicle at the first speed.

12. The vehicle control device of claim 8, wherein the controller is configured to:

based on the first V2X information, determine that the vehicle is unable to enter the exit ramp according to the control signal to drive the vehicle to the exit ramp; and based on the determination that the vehicle is unable to enter the exit ramp, determine an alternate route.

13. The vehicle control device of claim 1, wherein the controller is configured to:

determine that the expected driving route of the vehicle comprises entering an intersection;

determine that a left turn indicator lamp or a right turn indicator lamp is on;

based on the determination that a left turn indicator lamp or a right turn indicator lamp is on, classify roads associated with the intersection into a first group by:

determining, based on information associated with the intersection, first potential driving routes of other vehicles entering the intersection;

classifying the first potential driving routes that overlaps with the expected driving route of the vehicle into second potential driving routes; and classifying into the first group, (i) roads associated with the expected driving route of the vehicle, and (ii) roads associated with the second potential driving routes; and include the first group of roads in the region of interest.

14. A vehicle control device for a vehicle, the vehicle control device comprising:

a transceiver configured to receive vehicle-to-everything (V2X) information, the V2X information comprising position data; and a controller configured to generate a control signal associated with driving of the vehicle based on the V2X information, wherein the controller generates the control signal associated with driving of the vehicle by:

determining an expected driving route of the vehicle;

based on the determination of the expected driving route of the vehicle, determining a region of interest; and based on the determination of the region of interest, receiving first V2X information associated with the region of interest by:
   receiving, through the transceiver, available V2X information;
   determining that the position data of the received V2X information is within the region of interest;
   based on the determination that the position data of the received V2X information is within the region of interest, classifying the received V2X information as the first V2X information; and
   performing one or more of:
      processing the first V2X information; and
      displaying, through a display unit of the vehicle, the first V2X information,
wherein the controller is further configured to:
   determine that the expected driving route of the vehicle comprises entering an intersection;
   determine an operation of the vehicle at the intersection; and
   determine the region of interest based on (i) the determination that the expected driving route of the vehicle comprises entering an intersection, and (ii) the determined operation of the vehicle.

15. The vehicle control device of claim 14, wherein the controller is configured to determine the expected driving route of the vehicle based on at least one of a turn indicator lamp status, route information, manipulation of a steering wheel of the vehicle, or lane information of a road currently travelled by the vehicle.

16. The vehicle control device of claim 14, wherein the controller is configured to:
   determine that the expected driving route of the vehicle comprises entering an intersection;
   determine that a left turn indicator lamp or a right turn indicator lamp is on;
   based on the determination that a left turn indicator lamp or a right turn indicator lamp is on, classify roads associated with the intersection into a first group by:
      determining, based on information associated with the intersection, first potential driving routes of other vehicles entering the intersection;
      classifying the first potential driving routes that overlaps with the expected driving route of the vehicle into second potential driving routes; and
      classifying into the first group, (i) roads associated with the expected driving route of the vehicle, and (ii) roads associated with the second potential driving routes; and
   include the first group of roads in the region of interest.

17. The vehicle control device of claim 14, wherein the controller is configured to:
   determine that the expected driving route of the vehicle comprises entering an intersection;
   based on the determination that the expected driving route of the vehicle comprises entering the intersection, include the intersection in the region of interest;
   based on the determination that the expected driving route of the vehicle comprises entering an intersection, determine that the first V2X information comprises traffic signal information;
   based on the determination that the first V2X information comprises traffic signal information, determine a waiting time associated with the traffic signal; and
   based on the waiting time, generate a control signal to stop the vehicle for the waiting time.

18. A method of controlling a vehicle, the method comprising:
   determining an expected driving route of the vehicle;
   based on the determination of the expected driving route of the vehicle, determining a region of interest; and
   based on the determination of the region of interest, selectively receiving, through a transceiver configured to receive vehicle-to-everything (V2X) information, first V2X information associated with the region of interest by:
      transmitting, through the transceiver, a request for transmission of the first V2X information associated with the region of interest to communication-enabled devices; and
      selectively receiving, through the transceiver, the first V2X information transmitted by the communication-enabled devices that includes position data falling within the region of interest; and
   based on the first V2X information, generating a control signal associated with driving of the vehicle,
wherein the method further comprises:
   determining that the expected driving route of the vehicle comprises entering an intersection;
   determining an operation of the vehicle at the intersection; and
   determining the region of interest based on (i) the determination that the expected driving route of the vehicle comprises entering an intersection, and (ii) the determined operation of the vehicle.

19. The method of claim 18, comprising:
determining that the expected driving route of the vehicle comprises entering an intersection;
determining that a left turn indicator lamp or a right turn indicator lamp is on;
based on the determination that a left turn indicator lamp or a right turn indicator lamp is on, classifying roads associated with the intersection into a first group by:
   determining, based on information associated with the intersection, first potential driving routes of other vehicles entering the intersection;
   classifying the first potential driving routes that overlaps with the expected driving route of the vehicle into second potential driving routes; and
   classifying into the first group, (i) roads associated with the expected driving route of the vehicle, and (ii) roads associated with the second potential driving routes; and
including the first group of roads in the region of interest.

20. The method of claim 18, comprising:
determining that the expected driving route of the vehicle comprises entering an intersection;
based on the determination that the expected driving route of the vehicle comprises entering the intersection, including the intersection in the region of interest;
based on the determination that the expected driving route of the vehicle comprises entering an intersection, determining that the V2X information comprises traffic signal information;
based on the determination that the V2X information comprises traffic signal information, determining a waiting time associated with the traffic signal; and
based on the waiting time, generating a control signal to stop the vehicle for the waiting time.

21. A vehicle control device for a vehicle, the vehicle control device comprising:

a transceiver configured to receive vehicle-to-everything (V2X) information, the V2X information comprising position data; and a controller configured to generate a control signal associated with driving of the vehicle based on the V2X information, wherein the controller generates the control signal associated with driving of the vehicle by:

determining an expected driving route of the vehicle;

based on the determination of the expected driving route of the vehicle, determining a region of interest; and based on the determination of the region of interest, selectively receiving first V2X information associated with the region of interest by:

receiving, through the transceiver, a portion of available V2X information, the portion comprising position data;

determining that the position data of the available V2X information is within the region of interest; and based on the determination that the position data of the available V2X information is within the region of interest, receiving the first V2X information by receiving a remaining portion of the available V2X information, wherein the controller is further configured to:

determine that the expected driving route of the vehicle comprises entering an intersection;

determine an operation of the vehicle at the intersection; and determine the region of interest based on (i) the determination that the expected driving route of the vehicle comprises entering an intersection, and (ii) the determined operation of the vehicle.

* * * * *